(12) United States Patent
Gordon et al.

(10) Patent No.: US 12,128,531 B2
(45) Date of Patent: *Oct. 29, 2024

(54) ATTACHMENT MECHANISM FOR A POWER TOOL

(71) Applicant: MILWAUKEE ELECTRIC TOOL CORPORATION, Brookfield, WI (US)

(72) Inventors: Ben Gordon, Brookfield, WI (US); Peter Malak, Waukesha, WI (US); John L. Whealon, West Bend, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/968,548

(22) Filed: Oct. 18, 2022

(65) Prior Publication Data

US 2023/0045384 A1 Feb. 9, 2023

Related U.S. Application Data

(63) Continuation of application No. 17/346,736, filed on Jun. 14, 2021, now Pat. No. 11,504,830, which is a
(Continued)

(51) Int. Cl.
*B23B 45/00* (2006.01)
*B23Q 3/12* (2006.01)
(Continued)

(52) U.S. Cl.
CPC .......... *B25B 21/007* (2013.01); *B23B 45/003* (2013.01); *B23Q 3/12* (2013.01);
(Continued)

(58) Field of Classification Search
CPC ....... B23B 31/06; B23B 31/28; B23B 31/107; B23B 45/003; B25F 3/00; B25F 5/001;
(Continued)

(56) References Cited

U.S. PATENT DOCUMENTS 3,070,380 A * 12/1962 Holmberg ............. B23B 31/201
24/115 M
4,775,269 A 10/1988 Brix
(Continued)

FOREIGN PATENT DOCUMENTS

CN 2661383 Y 12/2004
CN 201483469 U 5/2010
(Continued)

OTHER PUBLICATIONS

International Search Report and Written Opinion for Application No. PCT/US2019/023307, dated Jul. 4, 2019 (9 pages).
(Continued)

*Primary Examiner* — Nicole N Ramos
(74) *Attorney, Agent, or Firm* — Michael Best & Friedrich LLP

(57) ABSTRACT

An accessory for use with a rotary power tool having a rotatable spindle and a first mating member. The accessory includes a housing having a body and a plurality of arms extending therefrom, a hub selectively engagable with the spindle to lock the accessory to the power tool, and a sleeve slidable along the arms between a first position and a second position, where the sleeve includes a plurality of apertures through which the corresponding plurality of arms extend. When the sleeve is in the first position the sleeve locks the hub to the spindle to secure the accessory to the power tool, and wherein when the sleeve is in the second position the sleeve disengages the hub from the spindle to release the accessory from the power tool.

26 Claims, 40 Drawing Sheets

Related U.S. Application Data continuation of application No. 16/360,201, filed on Mar. 21, 2019, now Pat. No. 11,034,002.

(60) Provisional application No. 62/647,463, filed on Mar. 23, 2018.

(51) Int. Cl.
    *B25B 21/00* (2006.01)
    *B25F 3/00* (2006.01)
    *B23B 31/02* (2006.01)
    *B23B 31/10* (2006.01)
    *B25B 23/00* (2006.01)

(52) U.S. Cl.
    CPC ............... *B25F 3/00* (2013.01); *B23B 31/02* (2013.01); *B23B 31/102* (2013.01); *B25B 23/0035* (2013.01)

(58) Field of Classification Search
    CPC . B25B 21/007; B25B 23/0035; Y10T 279/23; Y10T 279/3412; Y10T 279/3481; Y10T 279/26; Y10T 279/3406; Y10T 279/34; Y10T 408/957; Y10T 408/953; Y10T 408/95; Y10T 408/94
    See application file for complete search history.

(56) References Cited

U.S. PATENT DOCUMENTS

| | | | |
|---|---|---|---|
| 4,824,298 A | 4/1989 | Lippacher et al. | |
| 5,129,118 A | 7/1992 | Walmesley | |
| 5,180,261 A | 1/1993 | Schreiber | |
| 5,678,961 A | 10/1997 | Fleege et al. | |
| 5,951,026 A | 9/1999 | Harman, Jr. et al. | |
| 6,018,978 A | 2/2000 | Aniento | |
| 6,047,971 A | 4/2000 | Harman, Jr. et al. | |
| 6,079,716 A | 6/2000 | Harman, Jr. et al. | |
| 6,170,579 B1 | 1/2001 | Wadge | |
| 6,206,107 B1 | 3/2001 | Wadge | |
| 6,286,611 B1 | 9/2001 | Bone | |
| 6,293,559 B1 | 9/2001 | Harman, Jr. et al. | |
| 6,550,786 B2 | 4/2003 | Gifford et al. | |
| 6,551,037 B2 | 4/2003 | Gifford et al. | |
| 6,553,642 B2 | 4/2003 | Driessen | |
| 6,634,439 B2 | 10/2003 | Driessen | |
| 6,641,467 B1 | 11/2003 | Robson et al. | |
| 6,675,911 B2 | 1/2004 | Driessen | |
| 6,688,611 B2 | 2/2004 | Gifford et al. | |
| 7,021,399 B2 | 4/2006 | Driessen | |
| 7,828,630 B2 | 11/2010 | Robson et al. | |
| 7,997,837 B2 * | 8/2011 | Furusawa | B23Q 3/12 |
| | | | 408/239 R |
| 8,327,551 B2 | 12/2012 | Wasieleksi et al. | |
| 8,695,725 B2 | 4/2014 | Lau et al. | |
| 9,085,077 B2 | 7/2015 | Lau et al. | |
| 9,242,422 B2 | 1/2016 | Schweizer et al. | |
| 9,364,901 B2 * | 6/2016 | Yaksich | B23B 31/123 |
| 9,434,119 B2 | 9/2016 | Schweizer et al. | |
| 9,573,263 B2 | 2/2017 | Bowles et al. | |
| 9,573,335 B2 | 2/2017 | Schweizer et al. | |
| 9,579,784 B2 | 2/2017 | Lu et al. | |
| 9,751,176 B2 | 9/2017 | McRoberts et al. | |
| 2003/0066667 A1 | 4/2003 | Zhang | |
| 2005/0191139 A1 | 9/2005 | Hofbrucker et al. | |
| 2007/0079979 A1 | 4/2007 | Braun | |
| 2007/0290458 A1 | 12/2007 | Chuang | |
| 2009/0051129 A1 * | 2/2009 | Haas | B25D 17/088 |
| | | | 279/19 |
| 2010/0032179 A1 | 2/2010 | Hanspers et al. | |
| 2011/0127731 A1 | 6/2011 | Woecht et al. | |
| 2012/0074658 A1 | 3/2012 | Puzio et al. | |
| 2013/0161044 A1 * | 6/2013 | Hecht | B23B 31/12 |
| | | | 173/90 |
| 2013/0199810 A1 | 8/2013 | Wyler | |
| 2014/0017023 A1 * | 1/2014 | Grollmund | B23B 51/0473 |
| | | | 408/239 A |
| 2014/0131959 A1 | 5/2014 | Tussing | |
| 2014/0332243 A1 | 11/2014 | Baskar et al. | |
| 2014/0346744 A1 | 11/2014 | Herr et al. | |
| 2015/0115554 A1 * | 4/2015 | Tussing | B25F 3/00 |
| | | | 279/140 |
| 2015/0174752 A1 | 6/2015 | Lu et al. | |
| 2015/0306756 A1 | 10/2015 | Lau et al. | |
| 2015/0343583 A1 | 12/2015 | McRoberts et al. | |
| 2016/0303729 A1 * | 10/2016 | Blum | B25D 17/04 |
| 2016/0311032 A1 * | 10/2016 | Schenk | B25F 3/00 |
| 2017/0326717 A1 | 11/2017 | Cannaliato et al. | |

FOREIGN PATENT DOCUMENTS

| | | |
|---|---|---|
| CN | 206509985 U | 9/2017 |
| CN | 207077403 U | 3/2018 |
| DE | 102012220905 A1 | 5/2014 |
| DE | 202013100891 U1 | 6/2014 |
| DE | 102015200826 A1 | 7/2016 |
| DE | 102015200828 A1 | 7/2016 |
| DE | 102015200831 A1 | 7/2016 |
| DE | 102016104075 A1 | 9/2017 |
| EP | 0720888 A1 | 7/1996 |
| EP | 2383076 A2 | 11/2011 |
| WO | 2008057023 A1 | 5/2008 |
| WO | 2014001065 A2 | 1/2014 |
| WO | 2015162109 A1 | 10/2015 |

OTHER PUBLICATIONS

Extended European Search Report for Application No. 19770693.0 dated Oct. 25, 2021 (8 pages).

* cited by examiner

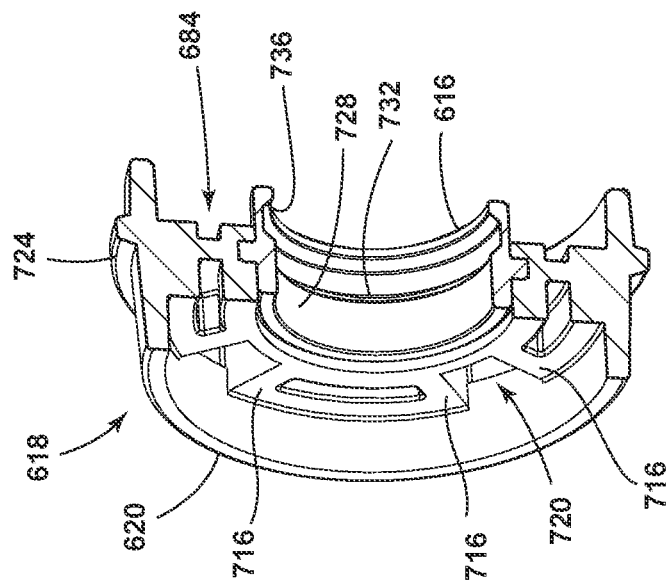
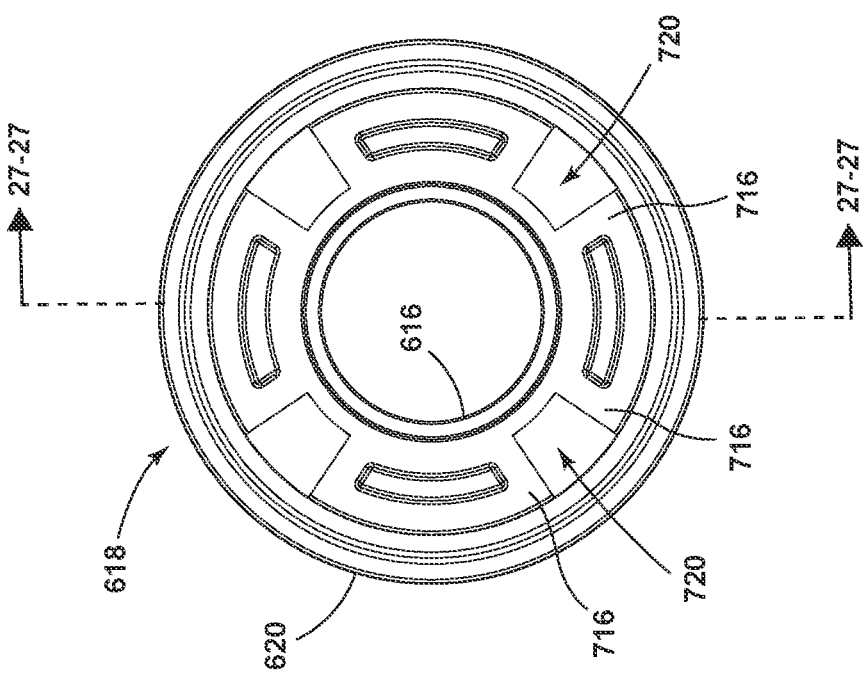
FIG. 27B
FIG. 27A

ATTACHMENT MECHANISM FOR A POWER TOOL

CROSS REFERENCE TO RELATED APPLICATIONS

This application is a continuation of U.S. patent application Ser. No. 17/346,736, filed on Jun. 14, 2021, now U.S. Pat. No. 11,504,830, which is a continuation of U.S. patent application Ser. No. 16/360,201, filed on Mar. 21, 2019, now U.S. Pat. No. 11,034,002, which claims priority to U.S. Provisional Application No. 62/647,463, filed on Mar. 23, 2018, the entire content of which is incorporated by reference herein.

FIELD OF THE INVENTION

The present invention relates to power tools, and more particularly to rotary power tools.

BACKGROUND OF THE INVENTION

Power tools, particularly rotary power tools, are often user-configurable to provide compatibility with different types and sizes of tool accessories. In some rotary power tools, a common driver unit can be used with multiple different accessories for performing different work functions.

SUMMARY OF THE INVENTION

The present invention provides, in one aspect, an attachment mechanism for connecting an accessory to a power tool including a tool-side attachment having a spindle driven by a motor of the power tool, an inner sleeve biased towards a first direction to axially lock the accessory to the power tool, an outer sleeve biased towards a second direction opposite the first direction to rotationally lock the accessory to the power tool, and a first mating member. An accessory-side attachment includes an input shaft received by a bore in the spindle, and a second mating member positioned on the accessory and configured to engage with the first mating member. In some embodiments, the attachment mechanism further includes a ball detent extending through an aperture in the spindle and configured to selectively engage with the input shaft. In some embodiments, the attachment mechanism further includes a slop-limiting mechanism configured to bias the accessory away from the power tool.

The present invention provides, in another aspect, an attachment mechanism for connecting an accessory to a power tool including a tool-side attachment having a spindle driven by a motor of the power tool and a first mating member configured to engage with an accessory-side attachment. The accessory-side attachment includes an input shaft received by a bore in the spindle, a plurality of ball detents configured to engage with an annular recess extending around a circumference of the first mating member, a second mating member having a plurality of engagement elements sized and shaped to engage with a plurality of engagement elements on the first mating member, and an outer sleeve fixed to the second mating member.

The present invention provides, in one aspect, an attachment mechanism for connecting an accessory to a rotary power tool. The attachment mechanism includes a tool-side attachment having a spindle driven by a motor of the power tool, and a first mating member positioned on the tool. The attachment mechanism includes an accessory-side attachment including a housing having a body and a plurality of arms extending therefrom, a hub rotatably supported within the housing between the arms and configured to be coupled to the spindle to receive torque therefrom, a ball detent disposed within the hub and selectively engagable with the spindle to axially lock the accessory to the power tool. A sleeve is axially slidable along the arms and relative to the hub between a first position in which the sleeve biases the ball detent radially inward and into engagement with the spindle when coupled to the hub to axially secure the accessory to the tool, and a second position in which the ball detent is disengageable from the spindle to release the accessory from the tool. A second mating member is axially fixed to the arms of the housing, wherein the sleeve is slidable between the second mating member and the body of the housing, and wherein the first and second mating members are engaged when the accessory is axially secured to the tool to rotationally fix the accessory to the tool.

The present invention provides, in one aspect, an accessory for use with a rotary power tool having a rotatable spindle and a first mating member. The accessory includes a housing having a body and a plurality of arms extending therefrom, a hub rotatably supported within the housing between the arms and configured to be coupled to the spindle to receive torque therefrom, a ball detent disposed within the hub and selectively engagable with the spindle to axially lock the accessory to the power tool, a sleeve axially slidable along the arms and relative to the hub between a first position in which the sleeve biases the ball detent radially inward and into engagement with the spindle when coupled to the hub to axially secure the accessory to the tool, and a second position in which the ball detent is disengageable from the spindle to release the accessory from the tool, and a second mating member axially fixed to the arms of the housing, wherein the sleeve is slidable between the second mating member and the body of the housing, and wherein the first and second mating members are engaged when the accessory is axially secured to the tool to rotationally fix the accessory to the tool.

Other features and aspects of the invention will become apparent by consideration of the following detailed description and accompanying drawings.

BRIEF DESCRIPTION OF THE DRAWINGS

FIG. 27A is a front view of a sleeve of the attachment mechanism of FIG. 22.

FIG. 27B is a cross-sectional view of the sleeve of FIG. 27A taken along line 27-27 in FIG. 27A.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
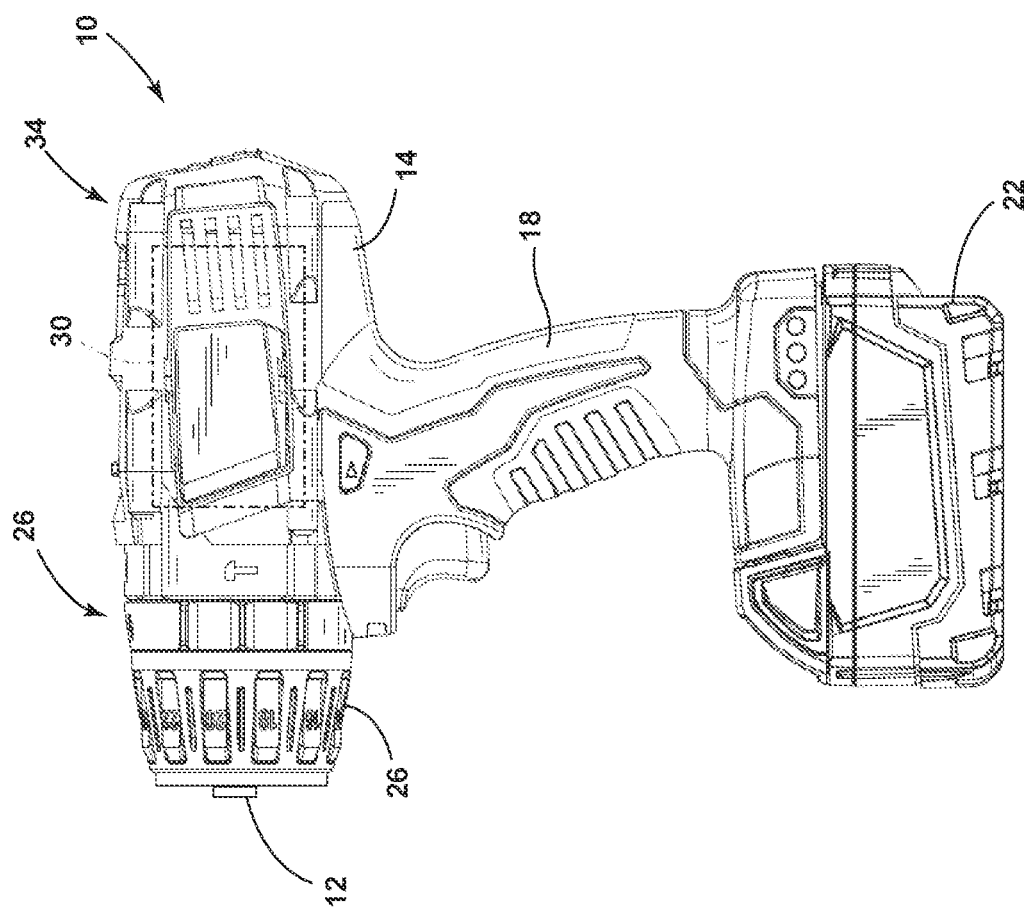
FIG. 1 is perspective view of a power tool in accordance with one embodiment of the invention.
Figure 2:
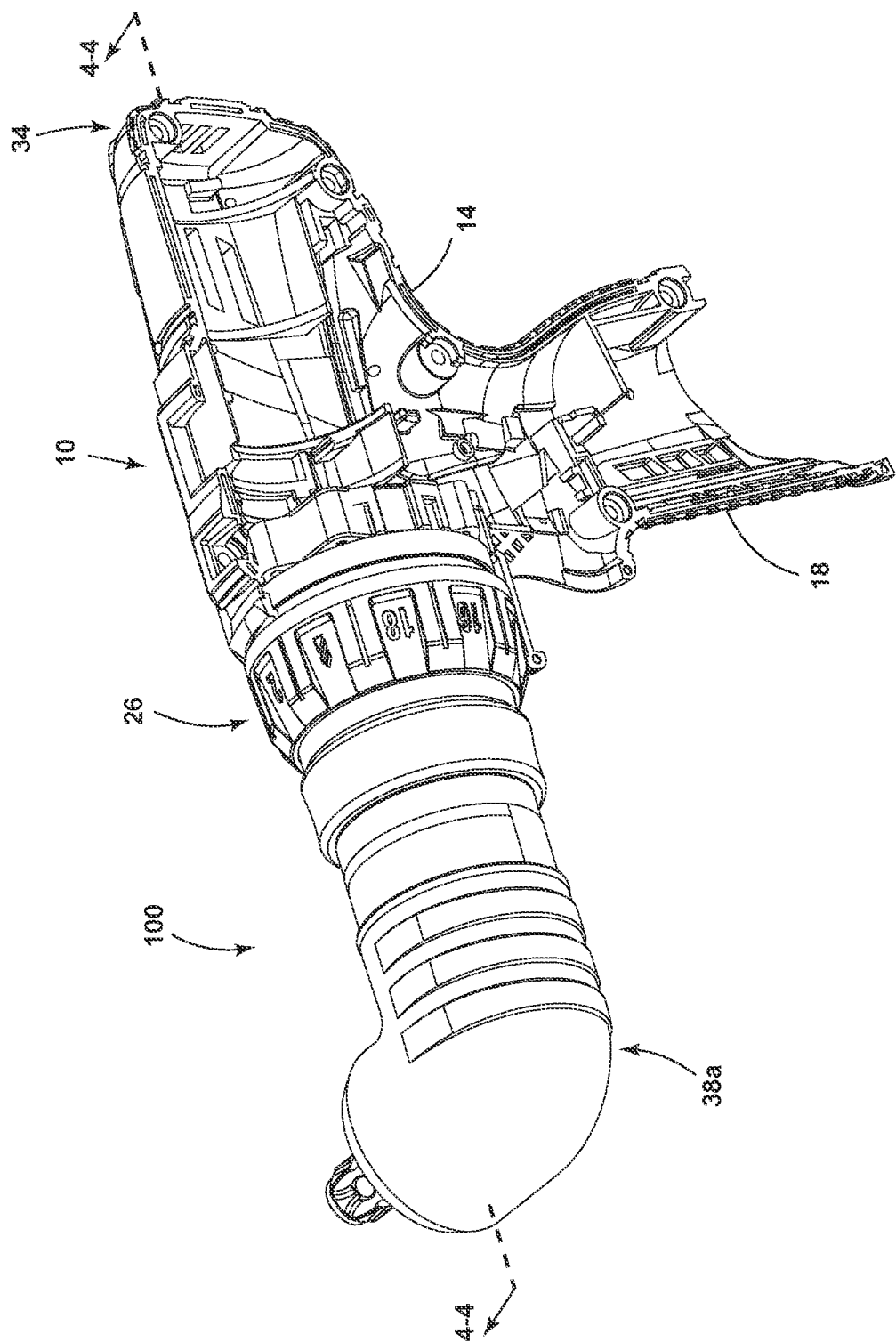
FIG. 2 is perspective view of an attachment mechanism for coupling an accessory to a power tool in according to one embodiment.
Figure 3:
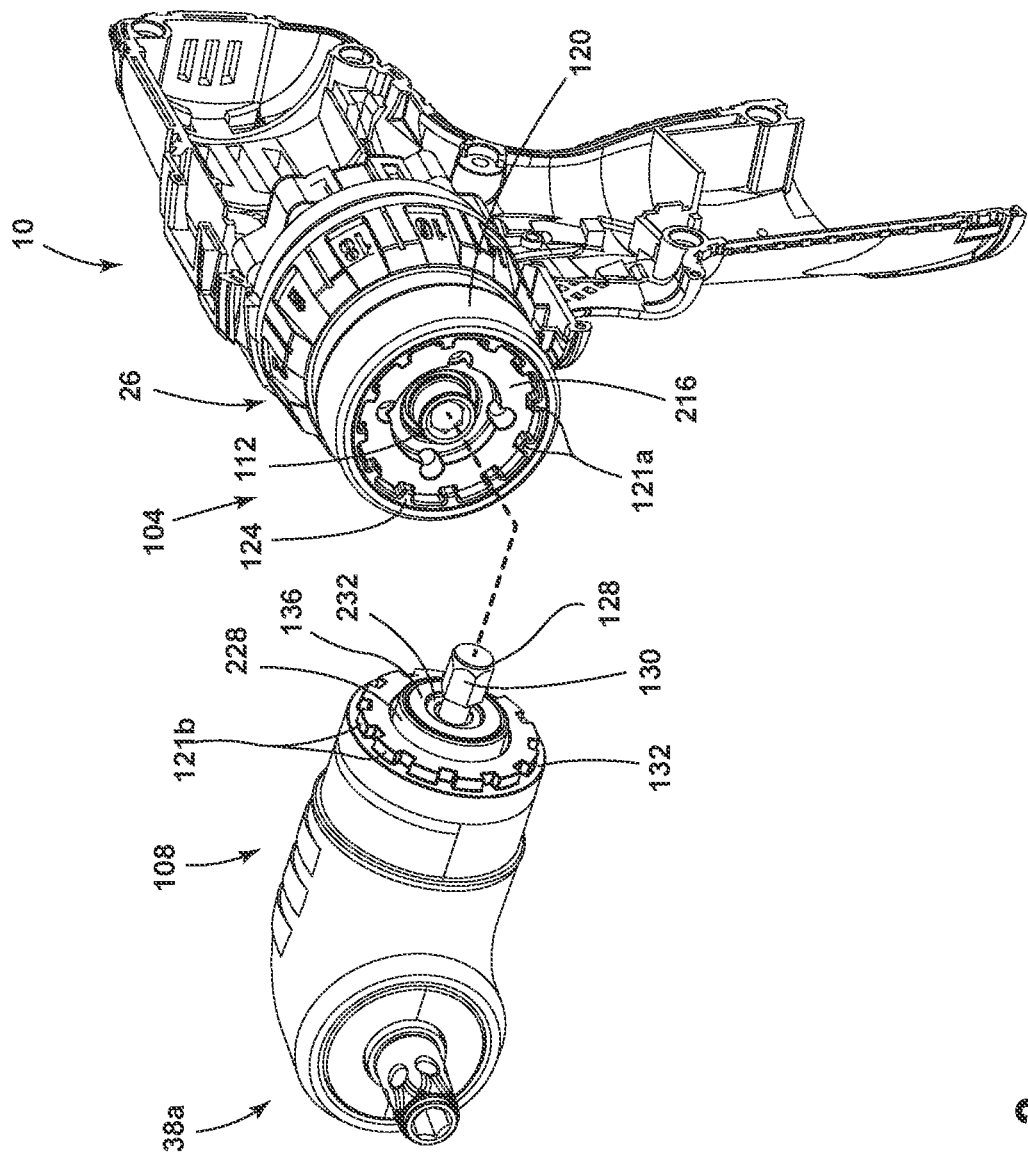
FIG. 3 is a perspective view of the attachment mechanism of FIG. 2 with the accessory disconnected from the power tool.
Figure 4:
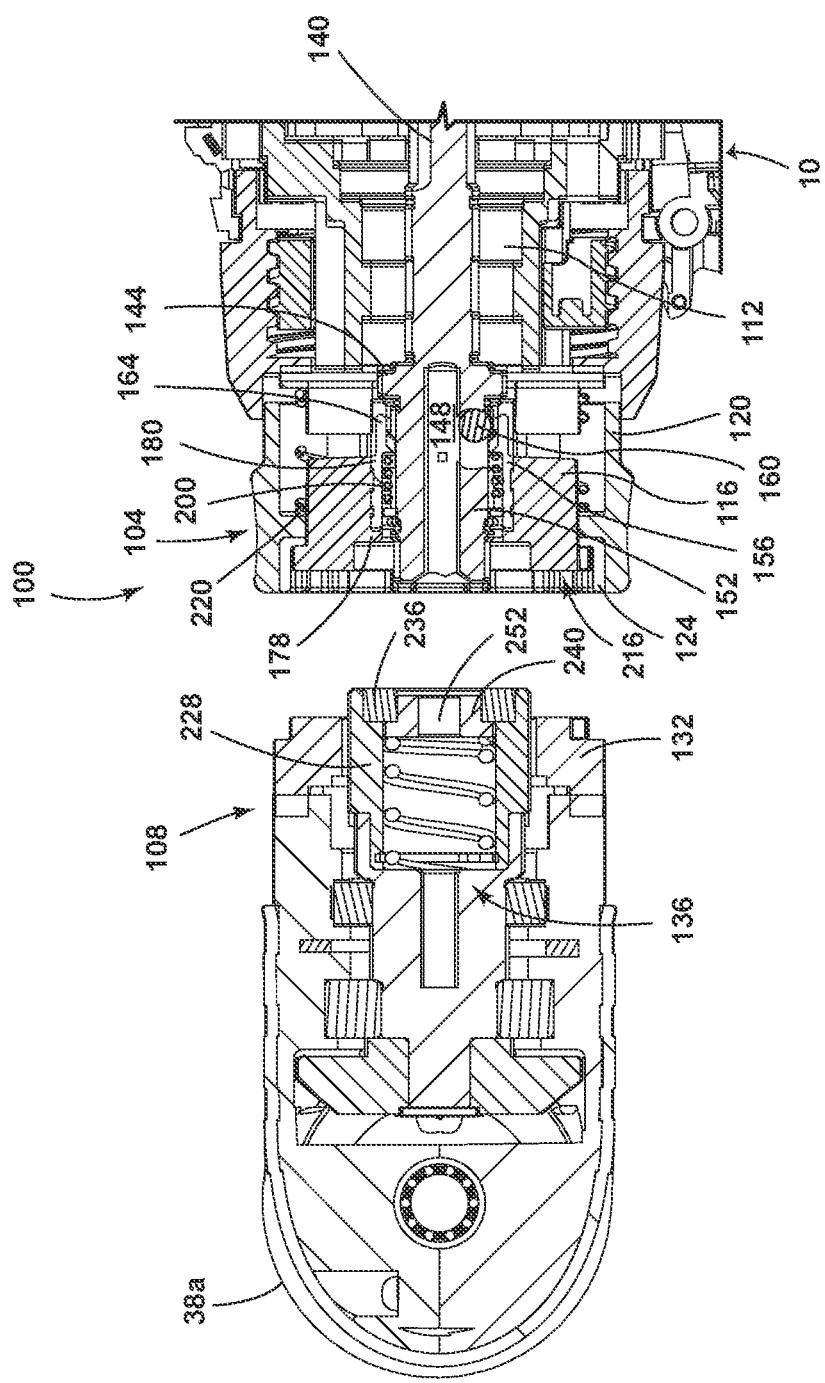
FIG. 4 is a cross-sectional view of the attachment mechanism of FIG. 2 taken along line 4-4 shown in FIG. 2 with the accessory disconnected from the power tool.
Figure 9:
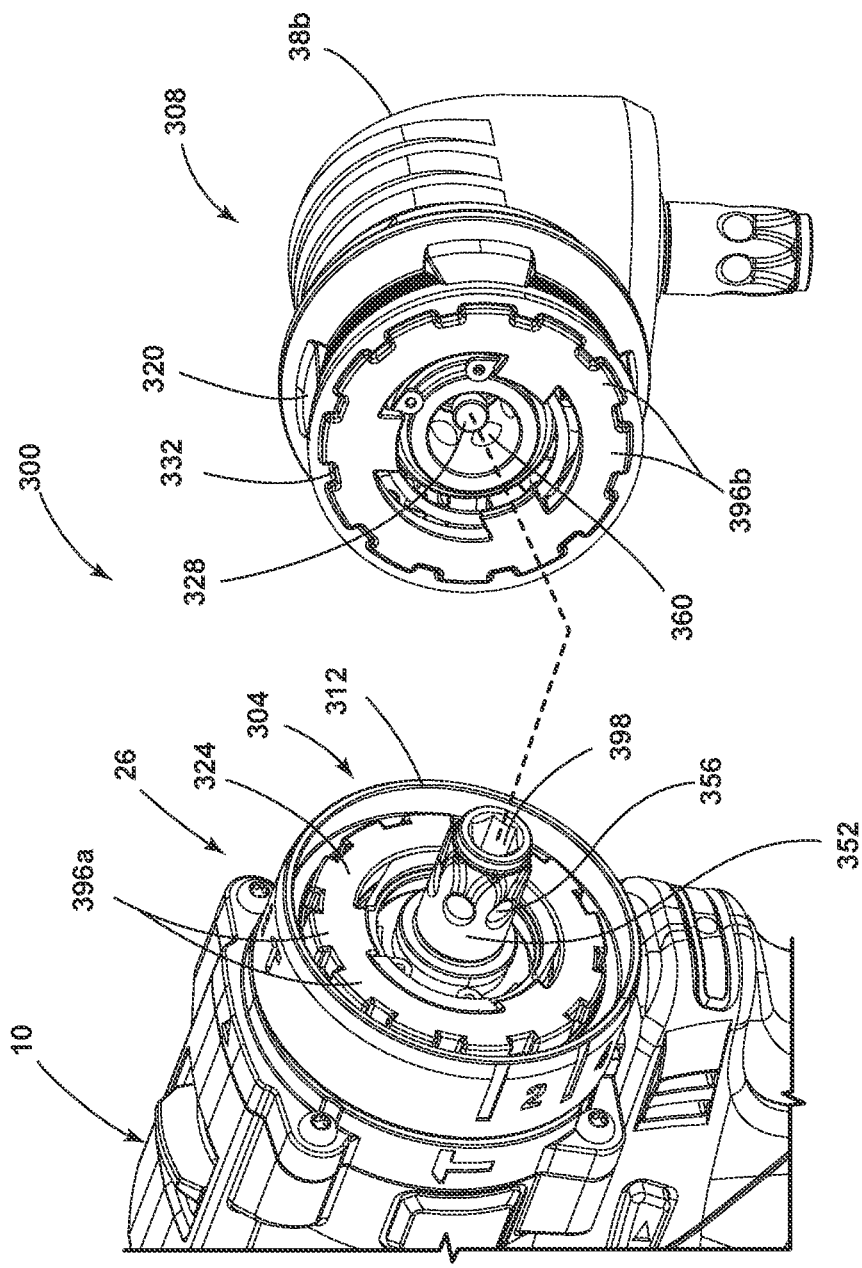
FIG. 9 is a perspective view of the attachment mechanism of FIG. 8 with the accessory disconnected from the power tool.
Figure 10:
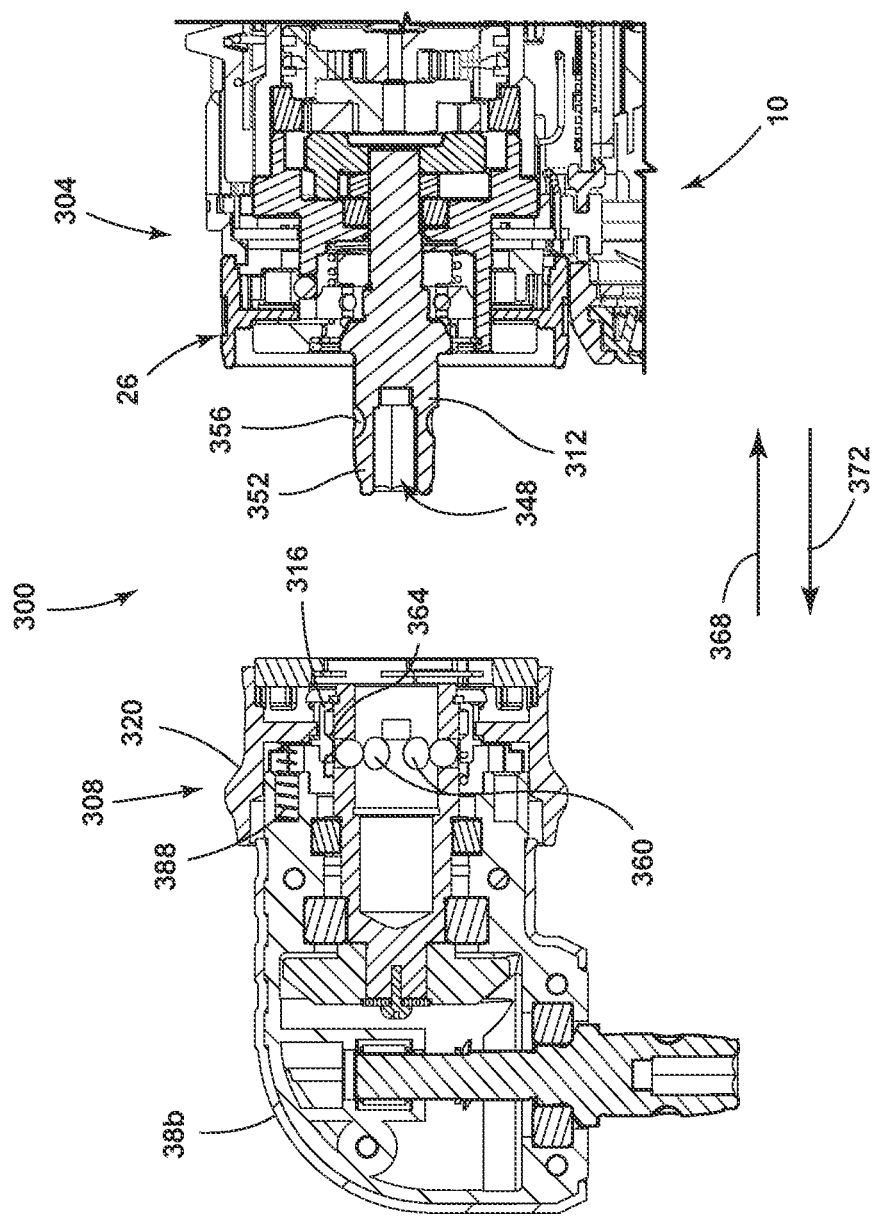
FIG. 10 is a cross-sectional view of the attachment mechanism of FIG. 8 taken along line 10-10 shown in FIG. 8 with the accessory disconnected from the power tool.
Figure 13:
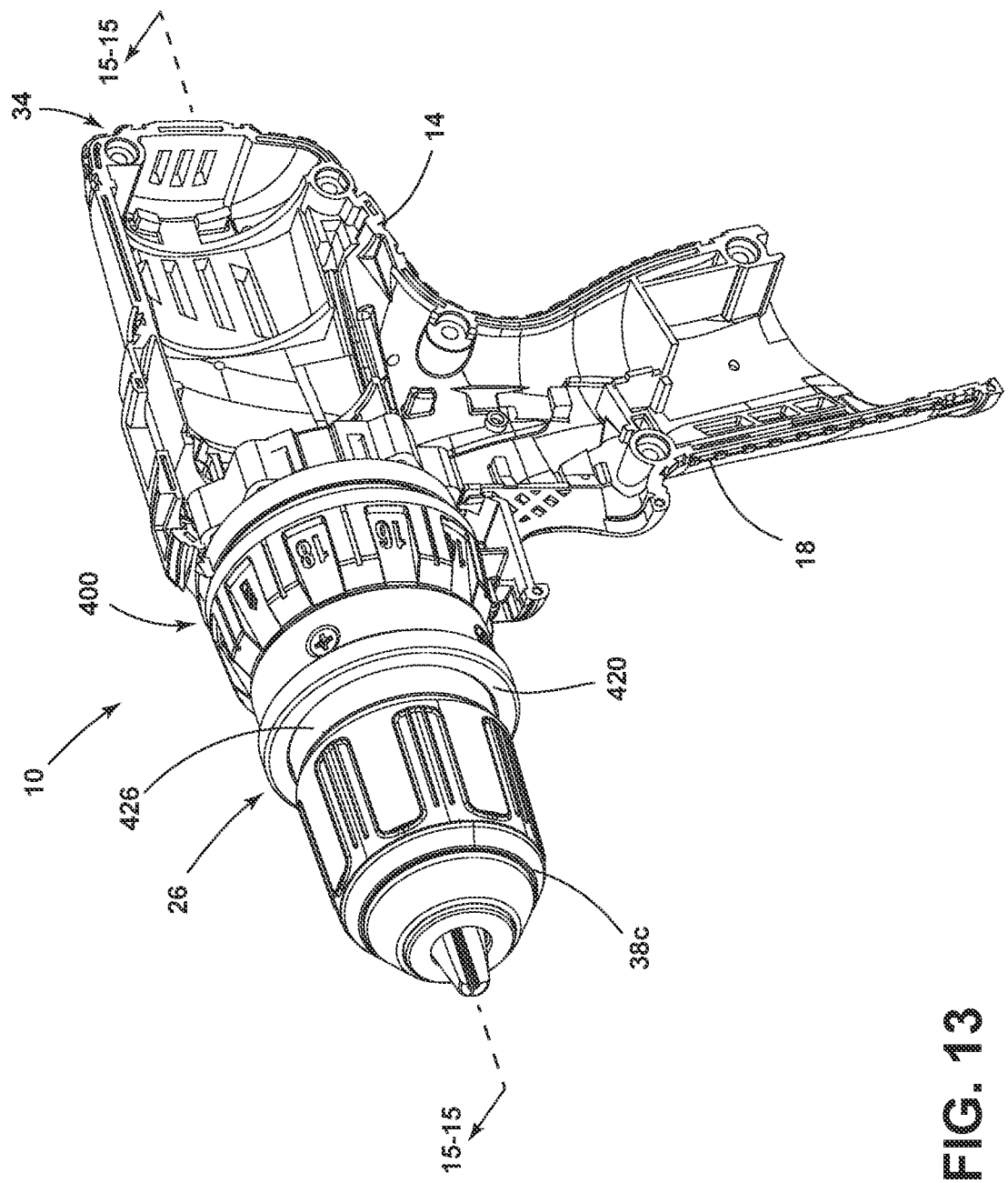
FIG. 13 is a perspective view of an attachment mechanism for coupling an accessory to a power tool in according to a third embodiment.
Figure 17:
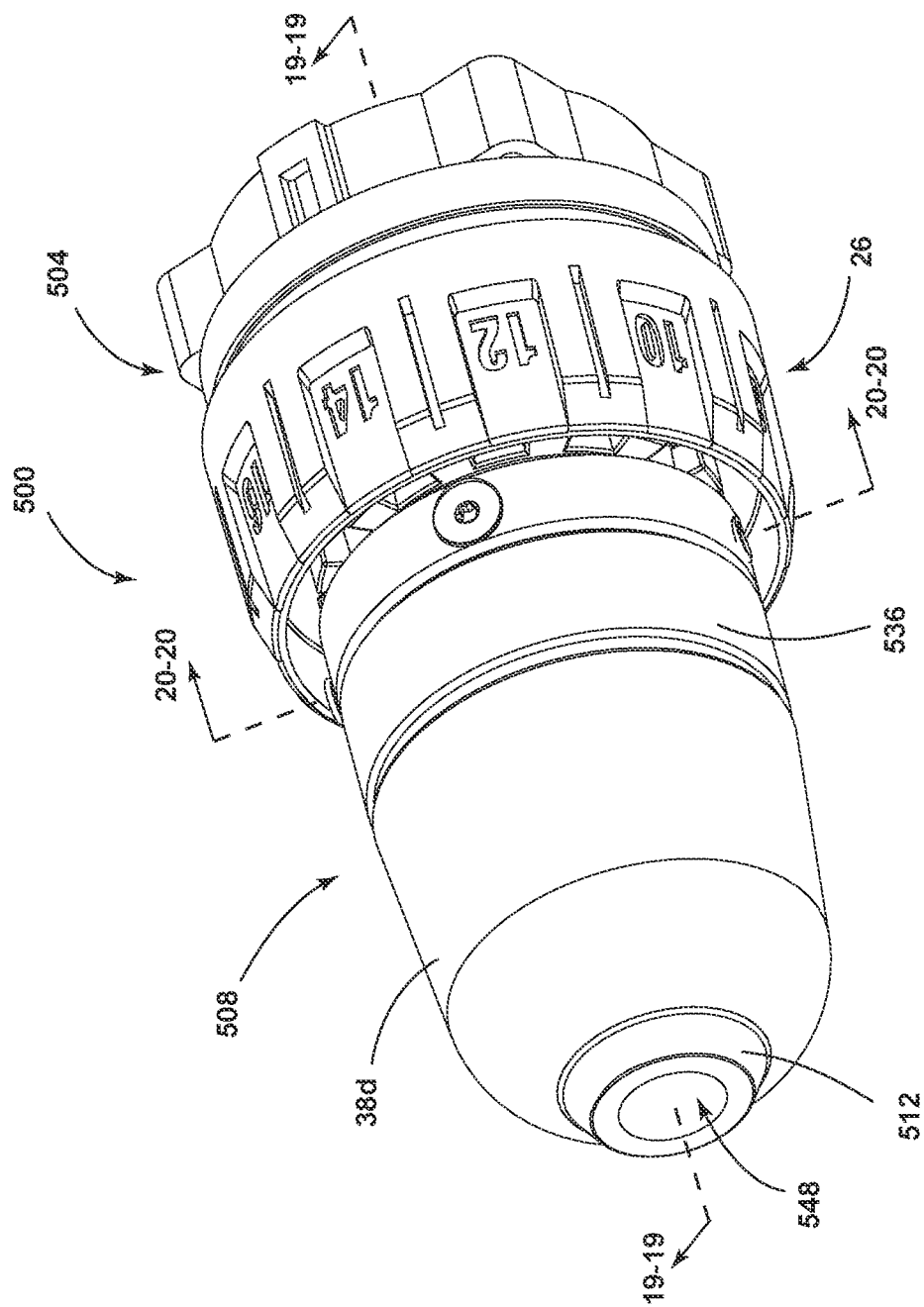
FIG. 17 is a perspective view of an attachment mechanism for coupling an accessory to a power tool in according to a forth embodiment.
Figure 18:
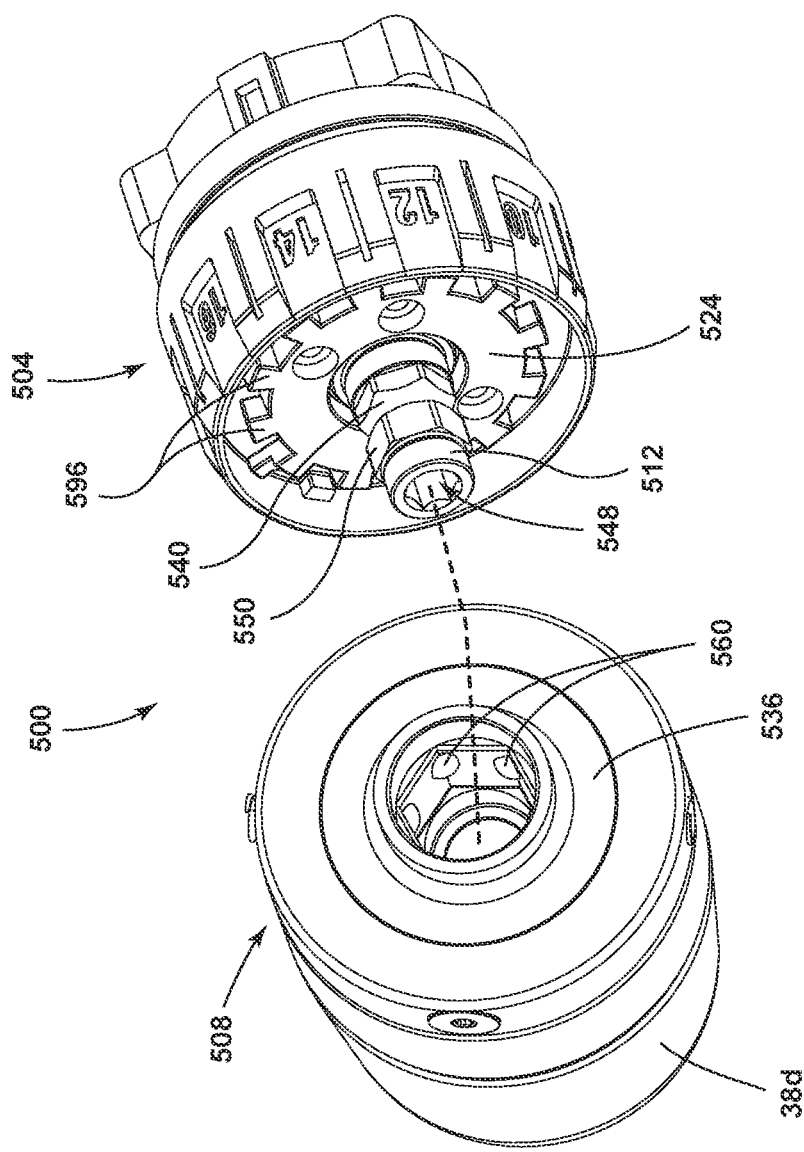
FIG. 18 is a perspective view of the attachment mechanism of FIG. 17 with the accessory disconnected from the power tool.
Figure 22:
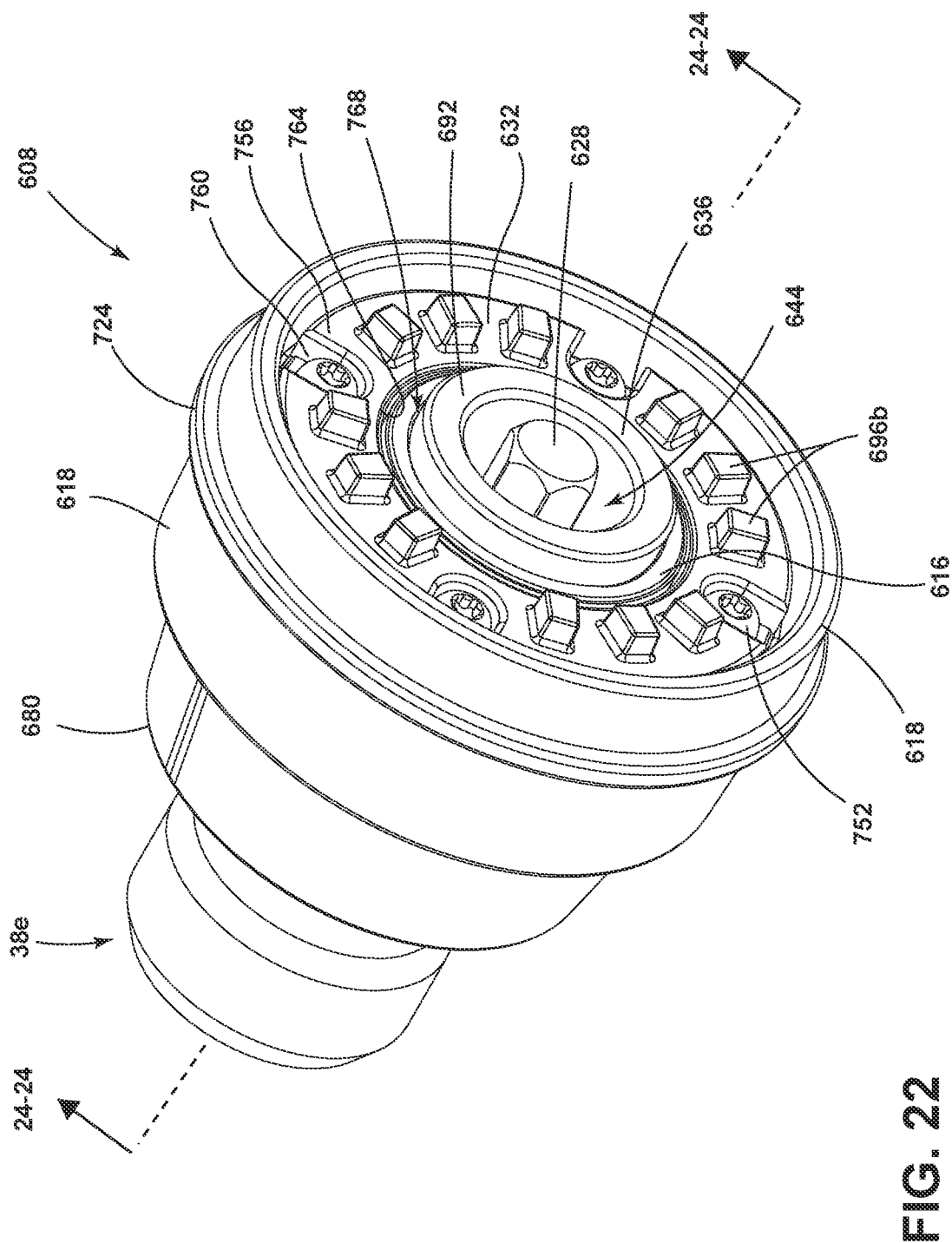
FIG. 22 is a perspective view of an accessory-side attachment of the fifth embodiment of an attachment mechanism for coupling an accessory to a power tool.
Figure 31:
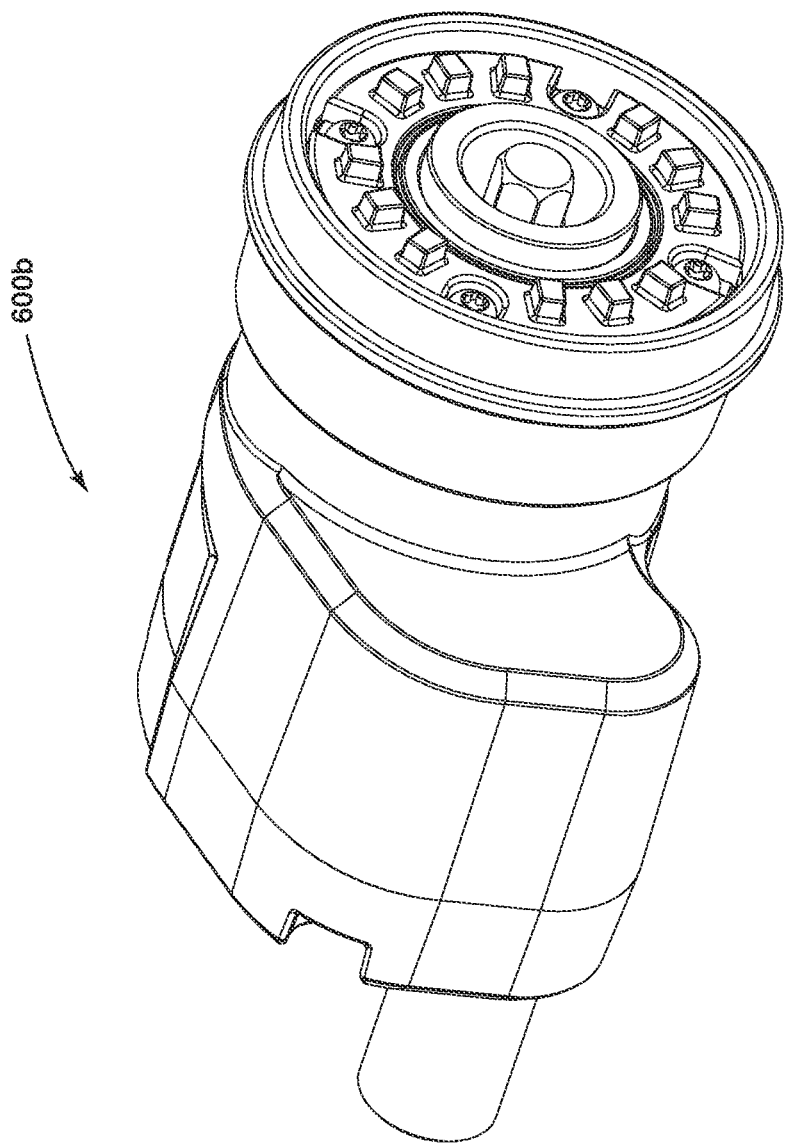
FIG. 31 is a perspective view of an off-set accessory including the same attachment mechanism as the hex attachment shown in FIGS. 22-31.
Figure 33:
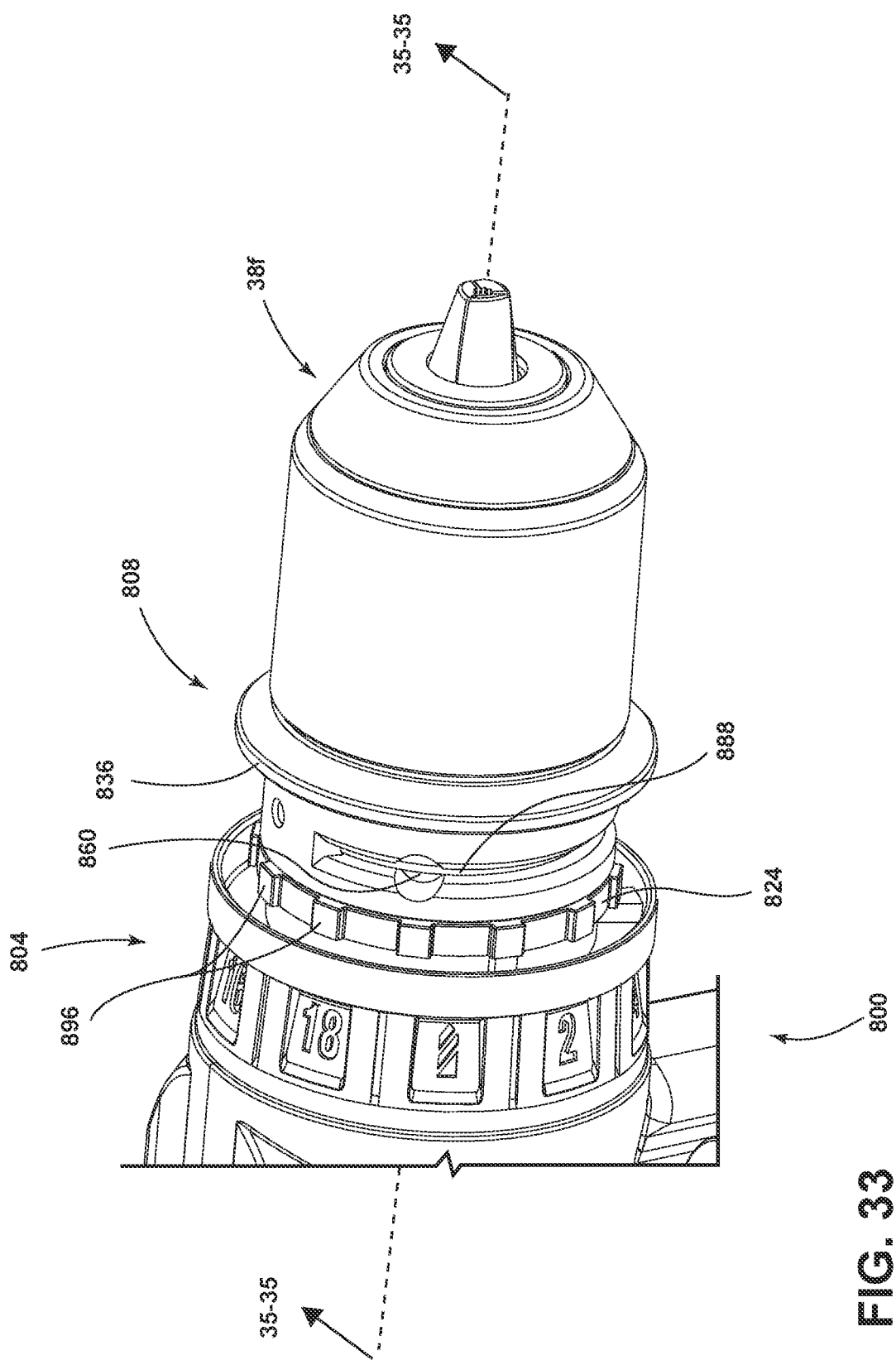
FIG. 33 is a perspective view of a sixth embodiment of an attachment mechanism for coupling an accessory to a power tool with a portion of a collar removed.
Figure 35:
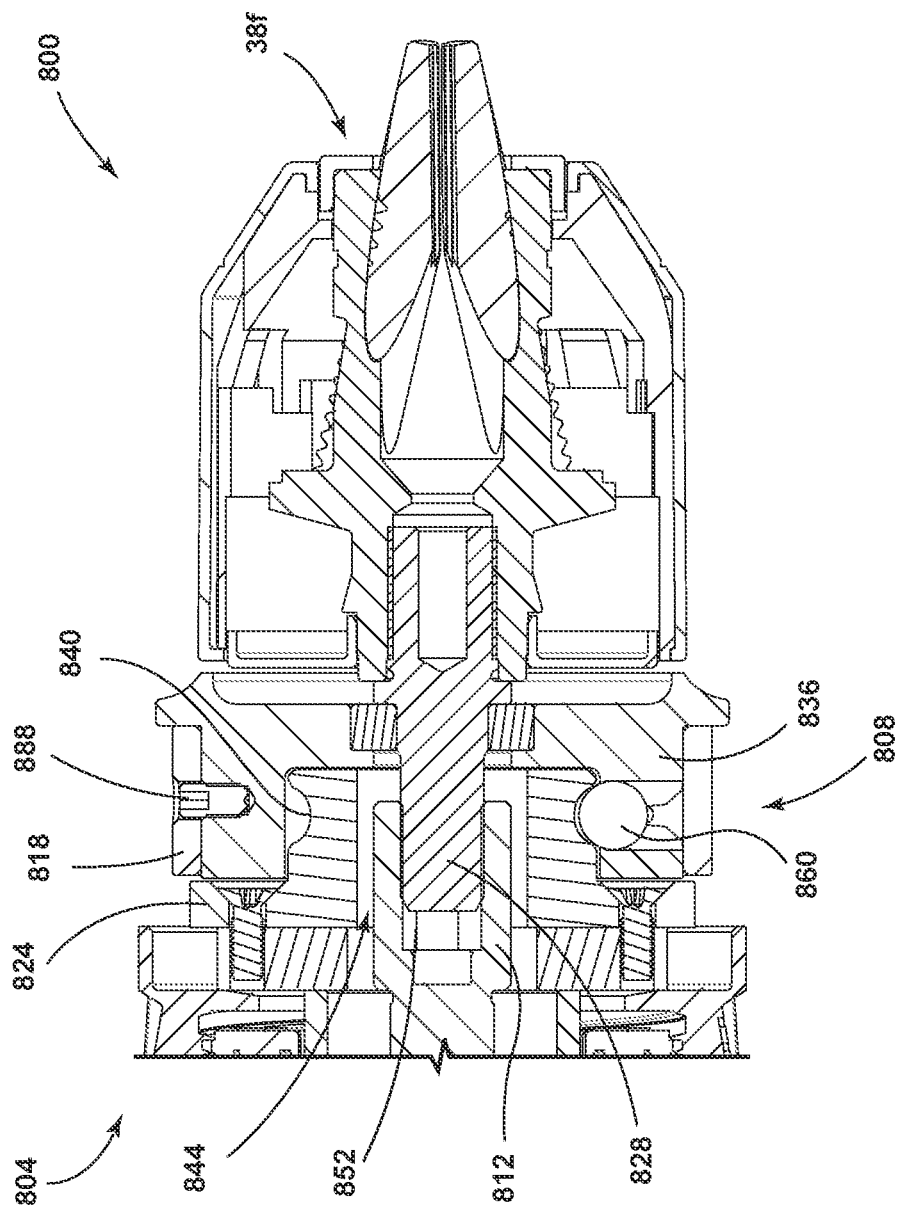
FIG. 35 is cross-sectional view of the attachment mechanism of FIG. 33 taken along line 35-35 in FIG. 33.
Figure 37:
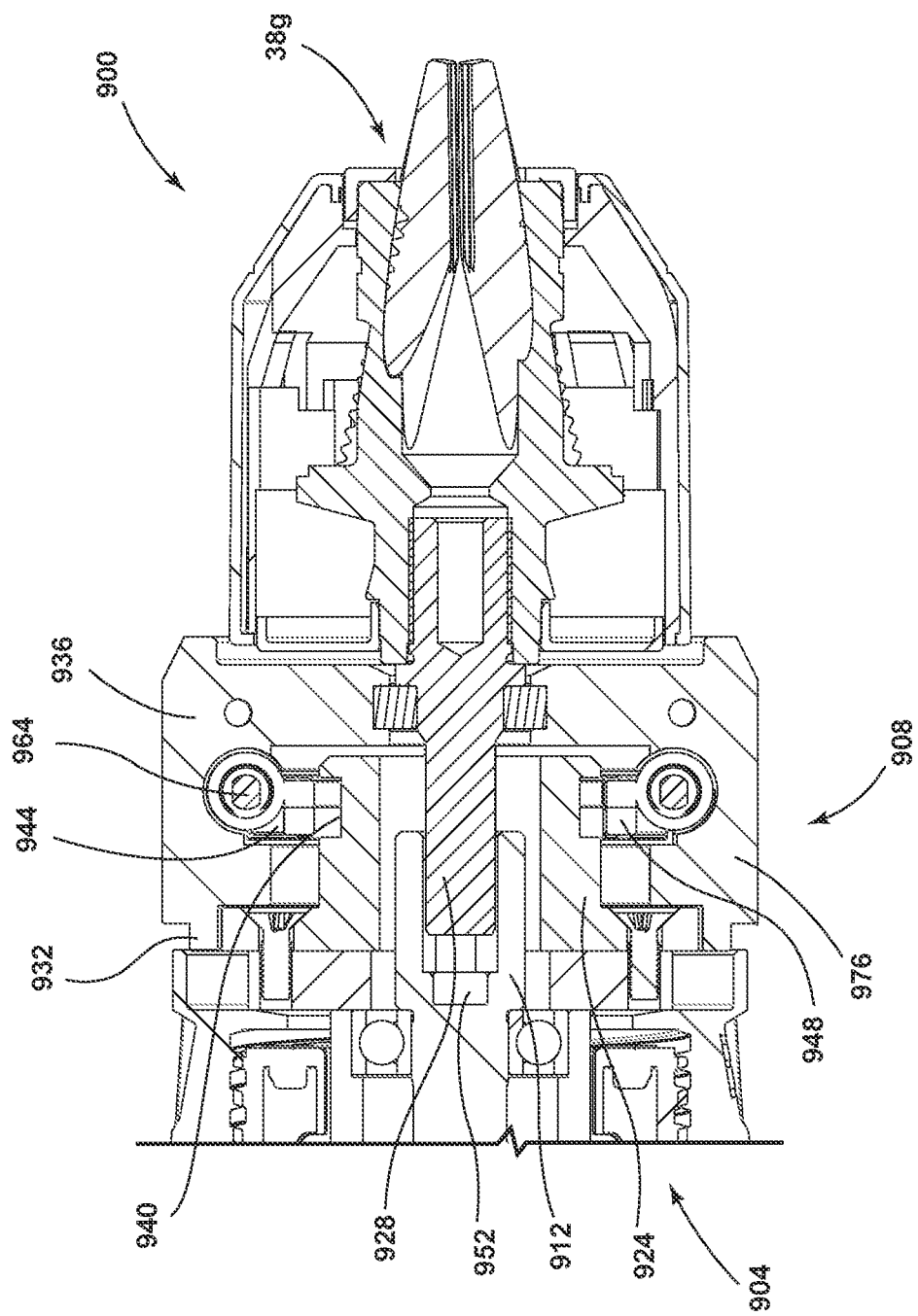
FIG. 37 is a cross-sectional view of the attachment mechanism of FIG. 35 taken along line 37-37 in FIG. 36.

FIG. 1 illustrates a rotary power tool 10, such as a drill or impact driver, including a housing 14, a handle 18 extending from the housing 14, and a battery 22 removably coupled to the handle 18. The housing 14 includes a nose 26 configured to receive a plurality of difference accessories 38 to be used with the power tool 10. For example, the nose 26 of the power tool 10 may be configured to receive accessories 38 such as an elbow attachment accessory 38 (e.g., a right angle accessory) as shown in FIGS. 3, 9, and 33; a drill chuck accessory 38 as shown in FIGS. 13, 35, and 37; a hex accessory 38 as shown in FIGS. 17 and 22, and off-set angle accessory as shown in FIG. 31. The nose 26 of the power tool 10 may also be configured to receive other types of accessories 38 not shown herein. As will be described in greater detail, the accessories 38 are attached to the nose 26 of the power tool 10 via an attachment mechanism. Portions of the attachment mechanism are integrated into the power tool housing 14 while other portions of the attachment mechanism are integrated into the accessories 38. As will be understood by a person skilled in the art, in some embodiments, the portions of the attachment mechanism described herein as being integrated into the power tool 10 may be alternatively integrated into the accessory 38, and vice versa. The power tool 10 further includes a drive system 30 (shown schematically in FIG. 1) having a motor positioned within a rear 34 of the housing 14. The drive system 30 provides power to a spindle extending from the nose 26 of the power tool 10, which in turn, transfers power to the accessory 38.

FIGS. 2-7 illustrate one embodiment of an attachment mechanism 100 for coupling an accessory 38a to a power tool 10. The attachment mechanism 100 includes a tool-side attachment 104 and an accessory-side attachment 108. In the illustrated embodiment, the tool-side attachment 104 includes a spindle 112, an inner sleeve 116, an outer sleeve 120, and a first mating member 124. The accessory-side attachment 108 includes an input shaft 128, a second mating member 132, and a slop-limiting mechanism 136.

With reference to FIGS. 4-7, the spindle 112 includes a solid first end 140 and a hollow second end 144. The first end 140 of the spindle 112 is driven by the drive system 30 of the power tool 10, which transfers rotational power to the spindle 112. The spindle 112 defines an axis of rotation about which the spindle 112 rotates. The second end 144 of the spindle 112 includes a bore 148 formed by a spindle wall 152, where the bore 148 is sized and shaped to receive an input shaft 128 of a tool (e.g., a tool bit) or an input shaft 128 of accessory 38a (e.g., an elbow attachment) to be used with the power tool 10. In the illustrated embodiment, the bore 148 has a hexagonal cross-sectional shape that corresponds to the shape of the input shaft 128. The input shaft 128 is shown in FIG. 3. The input shaft 128 is removed from the other figures in order to reveal other components of the attachment mechanism 100.

The spindle 112 includes one or more aperture 156 extending through the spindle wall 152 into the bore 148. A ball detent 160 is disposed within each aperture 156 to engage the input shaft 128 and lock the tool or accessory 38a to the nose 26 of the power tool 10. Specifically, the ball detent 160 can selectively engage with a recess 130 (FIG. 3) formed in the input shaft 128 of the tool or the accessory 38a in order to maintain the input shaft 128 within the bore 148 of the spindle 112. The ball detent 160 is movable between a first position (i.e., an locked position), in which the ball detent 160 is biased radially inward to engage the input shaft 128, and a second position (i.e., an unlocked position), in which the ball detent 160 is moved radially outward to release the input shaft 128.

With continued reference to FIGS. 4-7, the ball detent 160 is biased radially inward by the inner sleeve 116. The inner sleeve 116 includes a cam surface 164 that selectively forces the ball detent 160 radially inward. The inner sleeve 116 is movable in a first direction 168, towards the rear 34 of the power tool 10, in which the cam surface 164 biases the ball detent 160 radially inward (i.e., into a locked position). The inner sleeve 116 is movable in a second direction 172, away from the rear 34 of the power tool 10, in which the cam surface 164 releases the ball detent 160 (i.e., into an unlocked position). When the inner sleeve 116 and the ball detent 160 are in the locked position, the input shaft 128 (and thus the accessory 38a) is axially locked relative to the power tool 10. In the illustrated embodiment, the inner sleeve 116 and the ball detent 160 are biased towards the locked position.

Specifically, the inner sleeve 116 includes an inner surface 176 extending circumferentially around the spindle 112. The inner surface 176 of the inner sleeve 116 is spaced away from the spindle wall 152 to create a gap 184 between the spindle 112 and the inner sleeve 116. The cam surface 164 is formed by an annular protrusion 180 extending radially inward from the inner surface 176 of the inner sleeve 116. In the illustrated embodiment, the cam surface 164 contacts an outer surface of the spindle wall 152 and divides the gap 184 into two sections. A first section of the gap 184 forms an annular recess 192, which receives at least a portion of the ball detent 160 when the inner sleeve 116 and the ball detent 160 are in the unlocked position. A second section of the gap 184 houses a first spring 200 and a first retaining ring 204, which work together to bias the inner sleeve 116 towards the locked position. The first spring 200 is positioned between the first retaining ring 204 and the annular protrusion 180 of the inner sleeve 116 that forms the cam surface 164. The first retaining ring 204 is fixed with respect to the spindle 112, such that the first spring 200 pushes against the first retraining ring 204 and biases the inner sleeve 116 towards the rear 34 of the power tool 10 into the locked position. The inner sleeve 116 is released from the locked position by the outer sleeve 120.

With continued reference to FIGS. 4-7, the outer sleeve 120 is generally cylindrical and extends circumferentially around the inner sleeve 116. The outer sleeve 120 includes an inner surface 178 that is spaced away from the inner sleeve 116 to form a gap 186 between the inner sleeve 116 and the outer sleeve 120. The outer sleeve 120 includes an annular protrusion 182 that divides the gap 186 into two sections—a first section and a second section, which is located closer to the rear 34 of the power tool 10 than the first section. The annular protrusion 182 engages with a shoulder 208 on the inner sleeve 116. Specifically, the annular protrusion 182 extends radially inward from the outer sleeve 120 to mate with the shoulder 208 extending radially outward from the inner sleeve 116. The shoulder 208 extends at least partially into the first section of the gap 186, such that the shoulder 208 of the inner sleeve 116 is positioned farther from the rear 34 of the power tool 10 than the annular protrusion 182 of the outer sleeve 120.

This arrangement enables the outer sleeve 120 to move relative to the inner sleeve 116 when the outer sleeve 120 is moved in the first direction 168 towards the rear 34 of the power tool 10. However, movement of the outer sleeve 120 in the second direction 172, away from the rear 34 of the power tool 10, moves the inner sleeve 116 in the second direction 172. Accordingly, movement of the outer sleeve 120 in the second direction 172 releases the inner sleeve 116 from the locked position (i.e., releases the ball detent 160 from engagement with the input shaft 128).

In addition to releasing the inner sleeve 116 from the locked position, the outer sleeve 120 is configured to engage with the accessory 38a to selectively enable or prohibit rotation of the accessory 38a relative to the power tool 10.

With reference to FIG. 3, the outer sleeve 120 includes the first mating member 124, which is configured to engage with the second mating member 132 disposed on the accessory 38a. In the illustrated embodiment, the first mating member 124 is a ring having a plurality of engagement elements 121a (FIG. 3) in the form of castellations extending radially inward. The second mating member 132 is a ring having a plurality of engagement elements 121b (FIG. 3) in the form of castellations that are sized and shaped to engage with the castellations on the first mating member 124. When the first mating member 124 and the second mating member 132 are engaged, the first mating member 124 the second mating member 132 are rotationally fixed relative to one another, thereby rotationally fixing the accessory 38a to the power tool 10. In other embodiments, the first mating member 124 and the second mating member 132 include different types of engagement elements 212 capable of rotationally fixing the first mating member 124 relative to the second mating member 132.

Figure 5:
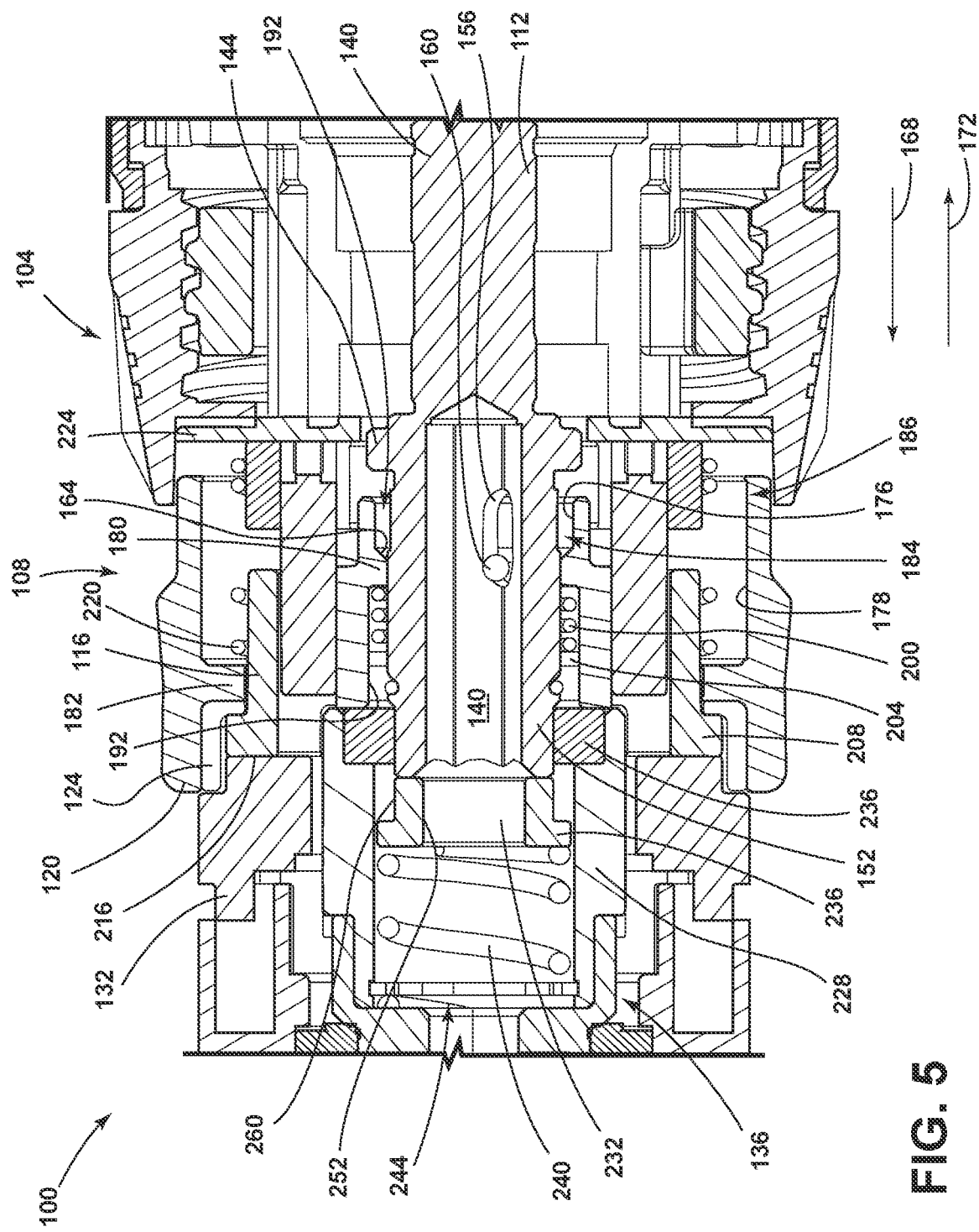
FIG. 5 a cross-sectional view of the attachment mechanism of FIG. 2 taken along line 4-4 shown in FIG. 2 with the accessory in an axially and rotationally locked position relative to the power tool.
Figure 6:
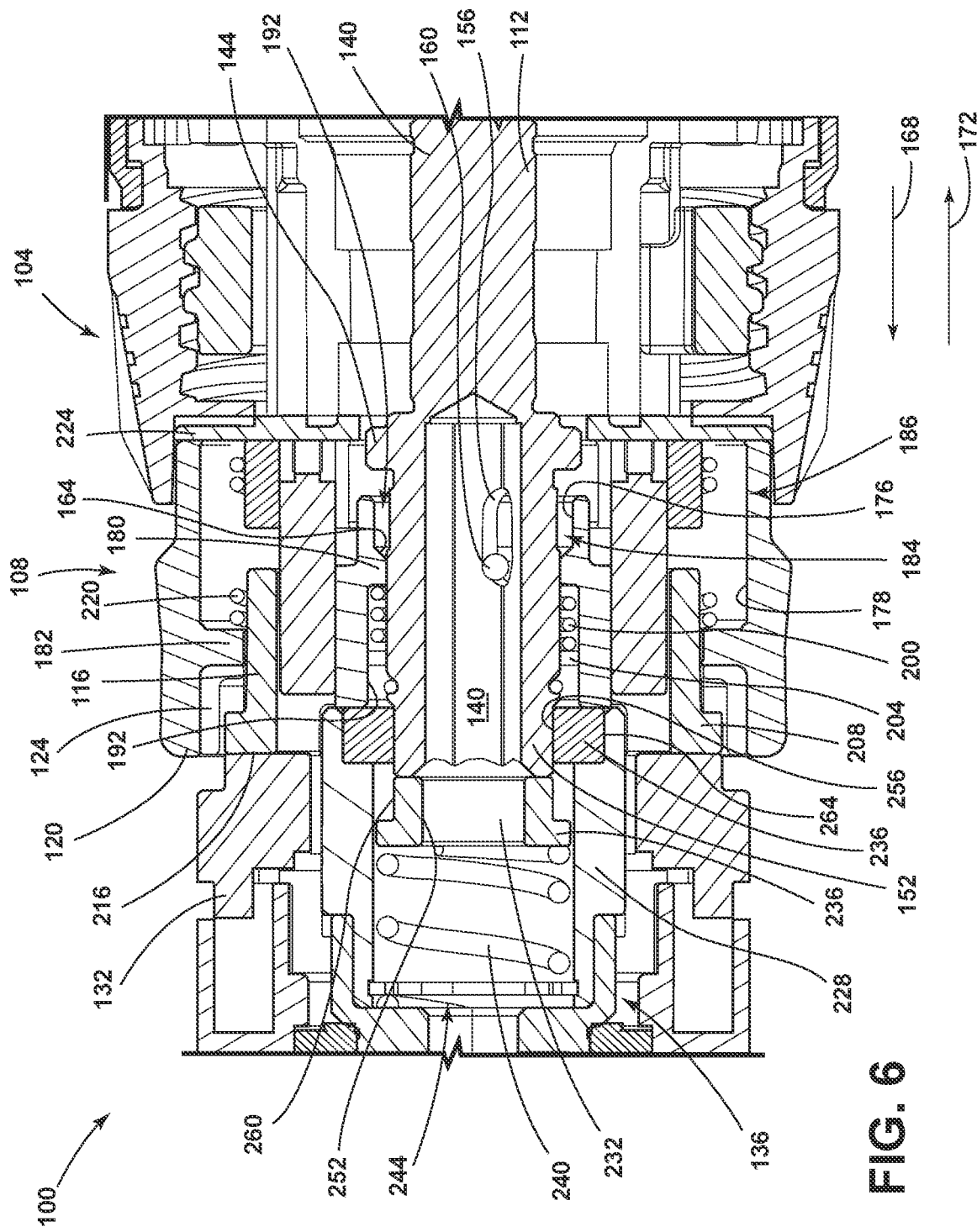
FIG. 6 a cross-sectional view of the attachment mechanism of FIG. 2 taken along line 4-4 shown in FIG. 2 with the accessory in an axially locked position and rotationally unlocked position relative to the power tool.
Figure 7:
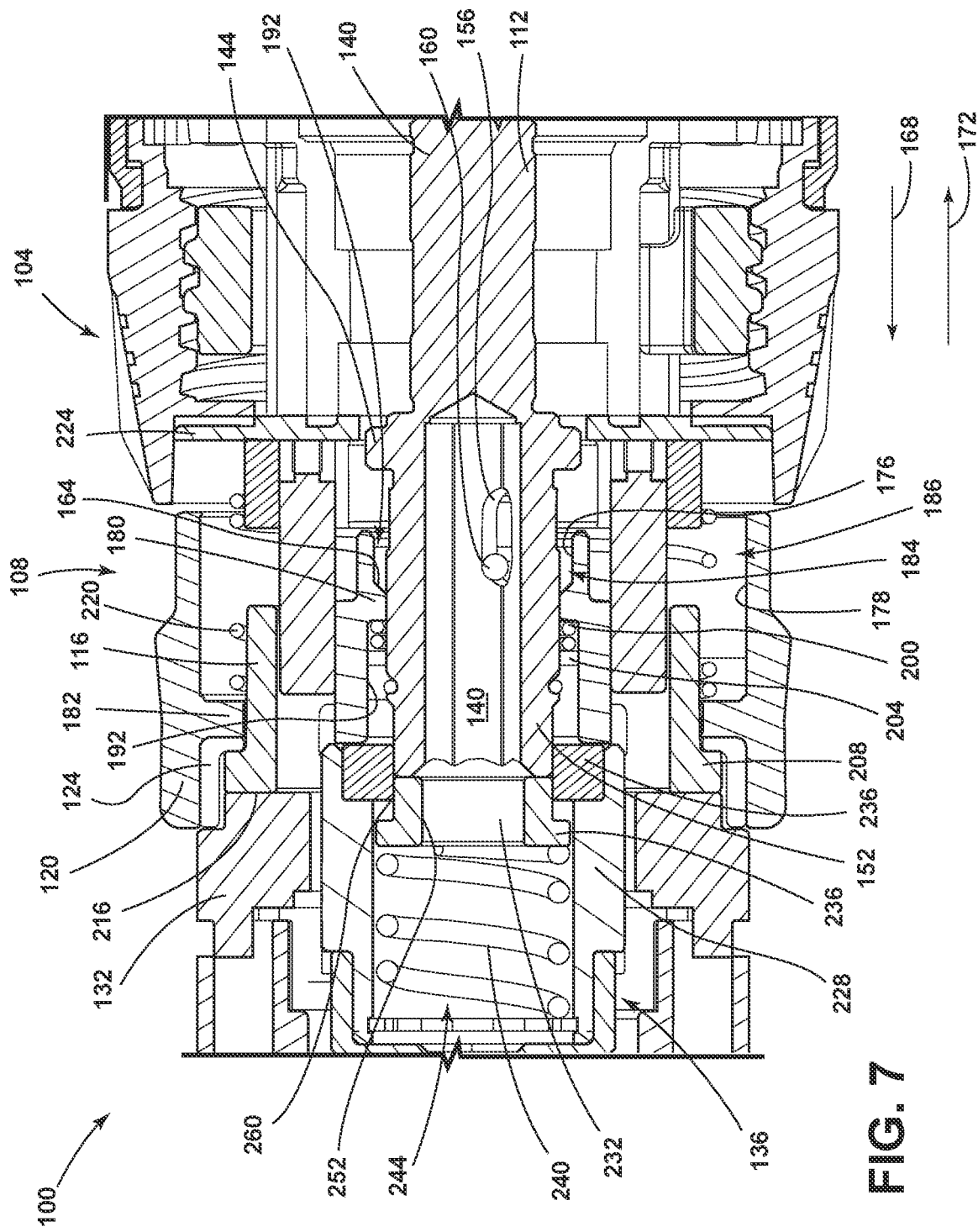
FIG. 7 a cross-sectional view of the attachment mechanism of FIG. 2 taken along line 4-4 shown in FIG. 2 with the accessory in an axially and rotationally unlocked position relative to the power tool.
Figure 8:
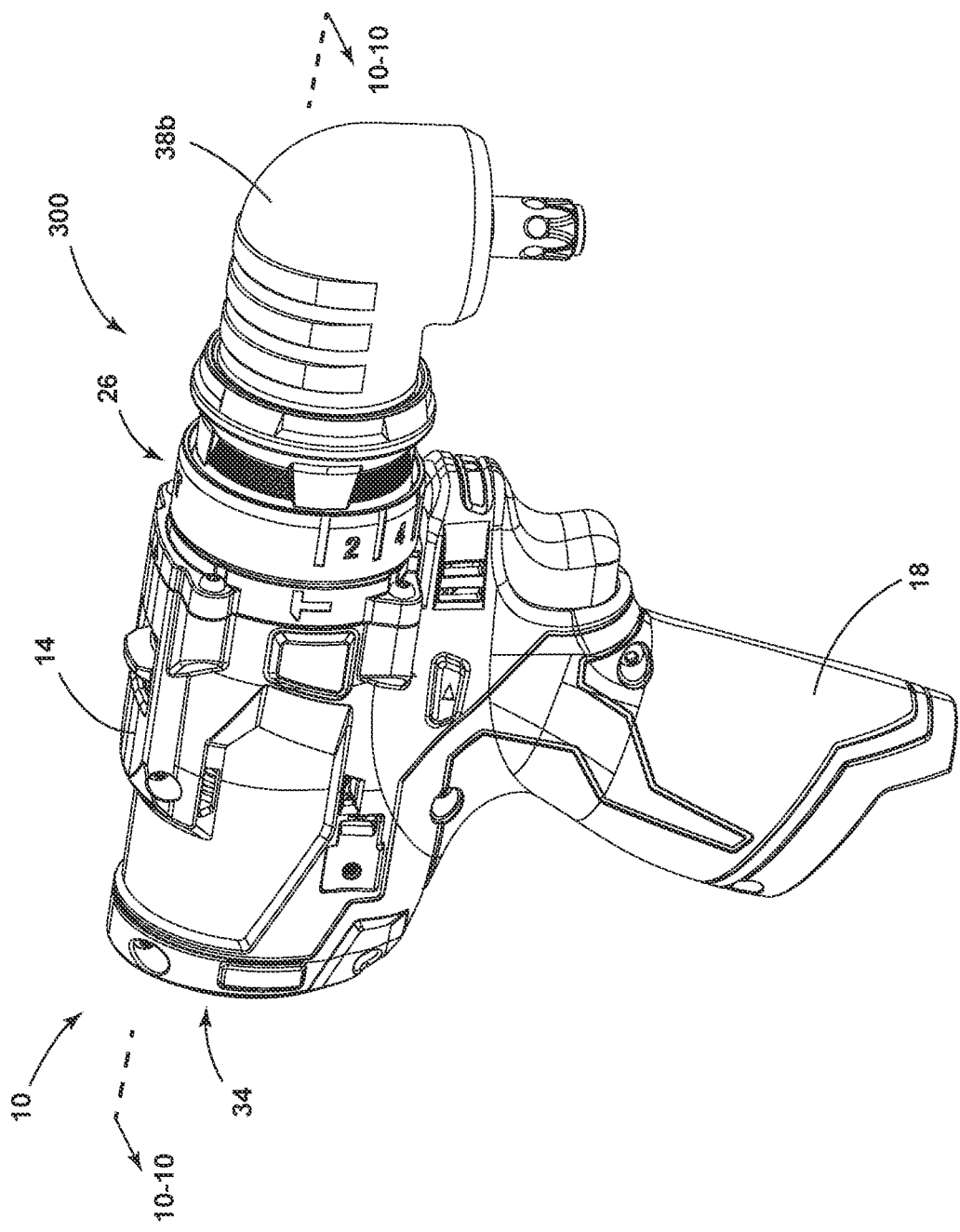
FIG. 8 is perspective view of an attachment mechanism for coupling an accessory to a power tool in according to a second embodiment.

With reference to FIGS. 4-7, the first mating member 124 is disposed within the first section of the gap 186. The first mating member 124 is fixed to the outer sleeve 120 such that movement of the outer sleeve 120 causes movement of the first mating member 124. In other embodiments, the first mating member 124 is integral with the outer sleeve 120. The outer sleeve 120 and the first mating member 124 are movable between a rotationally locked position, in which the accessory 38a is rotationally fixed relative to the power tool 10, and a rotationally unlocked position, in which the accessory 38a is freely rotatable relative to the power tool 10. FIG. 5 illustrates the outer sleeve 120 and the first mating member 124 in the rotationally locked position. When in this position, the first mating member 124 extends beyond a front wall 216 (see also, FIG. 3) of the inner sleeve 116 such that the engagement elements 212a of the first mating member 124 can engage with the engagement elements 212b on the second mating member 132. FIG. 6 illustrates the outer sleeve 120 and the first mating member 124 in the rotationally unlocked position. When in this position, the first mating member 124 does not extend beyond the front wall 216 of the inner sleeve 116 and the engagement elements 212a are disengaged from the engagement elements 212b in the second mating member 132 of the accessory 38a.

The outer sleeve 120 is biased towards the rotationally locked position. Specifically, in the illustrated embodiment, a second spring 220 is disposed within the second section of the gap 186 between the annular protrusion 182 of the outer sleeve 120 and a second retaining ring 224. The second retaining ring 224 is fixed relative to the spindle 112 such that the second spring 220 pushes against the second retaining ring 224 to bias the outer sleeve 120 and the first mating member 124 in the second direction 172 away from the rear 34 of the power tool 10.

As will be described in greater detail, the spring force of the first spring 200 is greater than the spring force of the second spring 220. Therefore, while the force of the second spring 220 maintains the outer sleeve 120 in the rotationally locked position, the force of the second spring 220 is insufficient to overcome the spring force of the first spring 200 in order to release the inner sleeve 116 from the locked position.

With continued reference to FIGS. 4-7, the attachment mechanism 100 further includes a slop-limiting mechanism 136 disposed within the accessory 38a. The slop-limiting mechanism 136 includes a hub 228, a plunger 232, a stopper 236, and a third spring 240. The hub 228 is generally hollow and forms a bore 244 through which the input shaft 128 extends. Specifically, the input shaft 128 extends through the hub 228 on the accessory 38a, beyond the end of the hub 228, and into the spindle 112 of the power tool 10 (when the accessory 38a is attached to the power tool 10). The third spring 240, the plunger 232, and the stopper 236 are disposed within the hub 228. The plunger 232 is positioned between the third spring 240 and the stopper 236. The plunger 232 is biased towards the stopper 236 by the third spring 240.

The third spring 240 is a helical spring that wraps around the input shaft 128. The plunger 232 and the stopper 236 each have an annular shape with an inner perimeter 252, 256 and an outer perimeter 260, 264, respecitvely. The input shaft 128 extends through both the plunger 232 and the stopper 236. The inner perimeter 256 of the stopper 236 is larger than the outer perimeter 260 of the plunger 232 such that the plunger 232 extends at least partially through the stopper 236. The stopper 236 engages with a shoulder 248 extending radially outward from the outer perimeter 260 of the plunger 232 in order to prevent the plunger 232 from being pushed out of the hub 228 by the third spring 240.

The third spring 240 biases the accessory 38a away from the power tool 10 in order to reduce the slop (i.e., unnecessary movement or slipping) between the accessory 38a and the power tool 10. More specifically, when the accessory 38a is attached to the power tool 10, the spindle 112 extends through the inner perimeter 256 of the stopper 236 and engages with the plunger 232. The spring force of the third spring 240 pushes the accessory 38a away from the power tool 10 via the engagement between the plunger 232 of the accessory 38a and the spindle 112 on the power tool 10.

In operation, when no external forces are present, the accessory 38a is biased to a fully locked position where the accessory 38a is both axially and rotationally fixed relative to the power tool 10. As shown in FIG. 5, the inner sleeve 116 and the ball detent 160 are biased towards the locked position to prevent axial movement of the input shaft 128 (not illustrated in FIG. 5) of the accessory 38a relative to the spindle 112 of the power tool 10. Thus, the accessory 38a is axially locked to the power tool 10. Additionally, the outer sleeve 120 and the first mating member 124 are biased towards the rotationally locked position to prevent rotation between the first mating member 124 of the power tool 10 and the second mating member 132 of the accessory 38a. Thus, the accessory 38a is rotationally locked to the power tool 10.

As previously mentioned, the accessory 38a is biased toward an axially locked position by the force of the first spring 200 towards the first direction 168. The accessory 38a is biased towards the rotationally locked position by the force of the second spring 220 towards the second direction 172. However, the force of the first spring 200 is greater than the force of the second spring 220. Therefore, the force of the second spring 220 is sufficient to maintain the outer sleeve 120 in the rotationally locked position, but insufficient to release the inner sleeve 116 from the axially locked position.

When an operator desires to remove the accessory 38a from the power tool 10 (i.e., axially release the accessory 38a), the operator slides the outer sleeve 120 in the second direction 172. In other words, the operator provides an additional force in the second direction 172 to supplement that provided by the second spring 220. Together, the force of the second spring 220 and the additional force provided by the operator will overcome the spring force of the first spring 200 in order to move the inner sleeve 116 in the second direction 172 to release the accessory 38a.

When an operator desires to rotate the accessory 38a relative to the power tool 10, the operator slides the outer sleeve 120 in the first direction 168 to disengage the first mating member 124 from the second mating member 132, thereby allowing the accessory 38a to be rotated. Once the accessory 38a is in the desired rotational position, the operator releases the outer sleeve 120, which is automatically biased back towards the rotationally locked position by the spring 220. Sliding the outer sleeve 120 in the first direction 168 does not release the inner sleeve 116 from the axially locked position.

FIGS. 8-12 illustrate a second embodiment of an attachment mechanism 300 configured to connect an accessory 38*b* to a power tool 10. The attachment mechanism 300 includes a tool-side attachment 304 and an accessory-side attachment 308. In the illustrated embodiment, the tool-side attachment 304 includes a spindle 312 and a first mating member 324. The accessory-side attachment 308 includes an inner sleeve 316, an outer sleeve 320, a plurality of ball detents 360, and a second mating member 332.

The spindle 312 includes a hexagonal bore 348 formed by a spindle wall 352, where the bore 348 is sized and shaped to receive an input shaft 328 (FIG. 9) of a tool (e.g., a tool bit) or an input shaft 328 of accessory 38*b* (e.g., an elbow accessory attachment) to be used with the power tool 10. The spindle 312 includes a plurality of apertures 356 extending at least partially into the spindle wall 352. In the illustrated embodiment, the apertures 356 do not extend all the way through the spindle wall 352 and into the bore 348. However, in some embodiments the apertures 356 are through holes extending into the bore 348.

A plurality of ball detents 360 are carried by a hub 336 positioned within the accessory 38*b*. The ball detents 360 and are configured to engage with the plurality of apertures 356 in the spindle 312. The engagement between the ball detents 360 and the spindle 312 locks the accessory 38*b* to the power tool 10. The ball detents 360 are movable between a first position (i.e., a locked position), in which the ball detents 360 are biased radially inward to engage the spindle 312, and a second position (i.e., an unlocked position), in which the ball detents 360 are moved radially outward to release the spindle 312. The ball detents 360 are biased radially inward by the inner sleeve 316.

Figure 11:
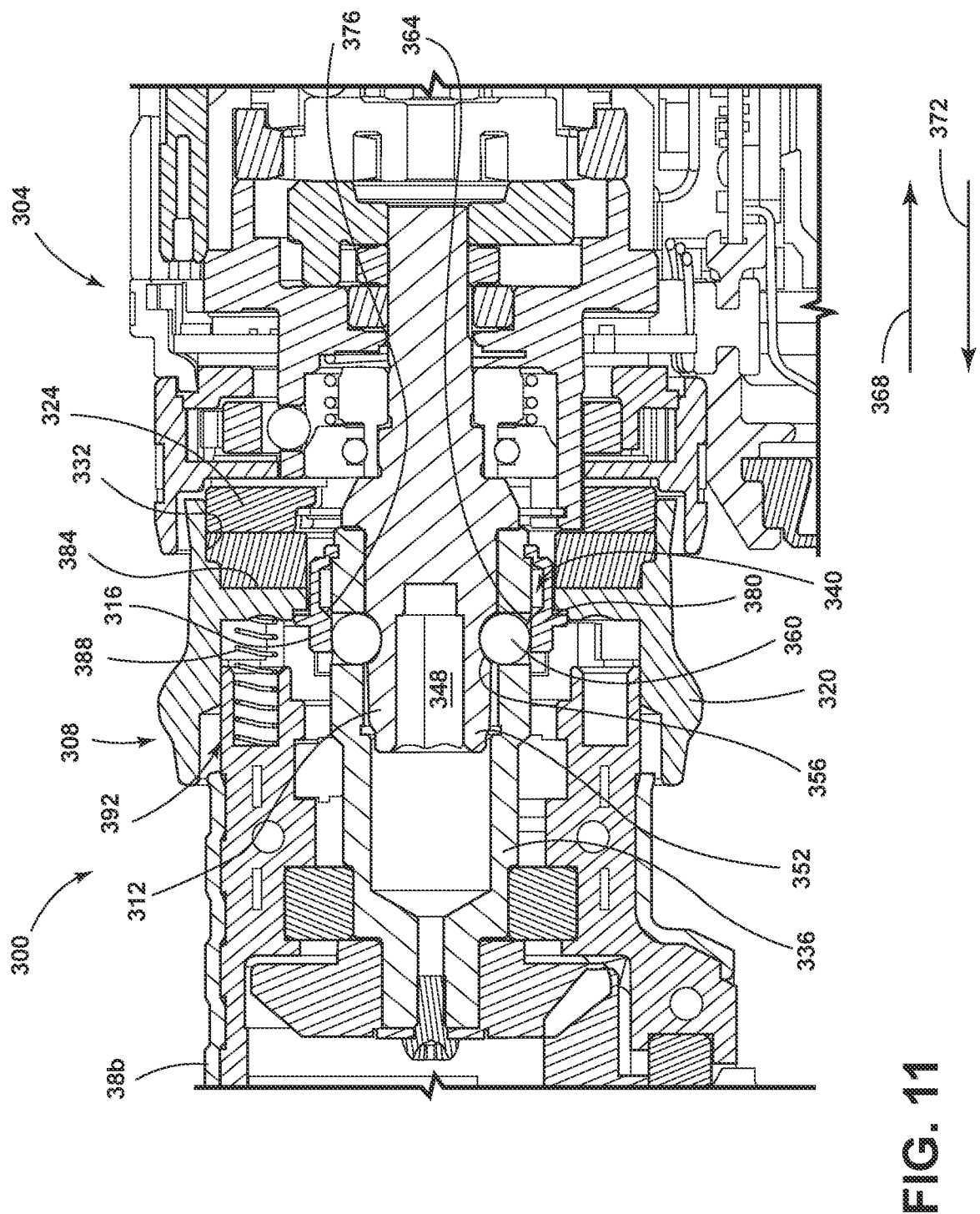
FIG. 11 is a cross-sectional view of the attachment mechanism of FIG. 8 taken along line 10-10 shown in FIG. 8 with the accessory in an axially and rotationally locked position relative to the power tool.
Figure 12:
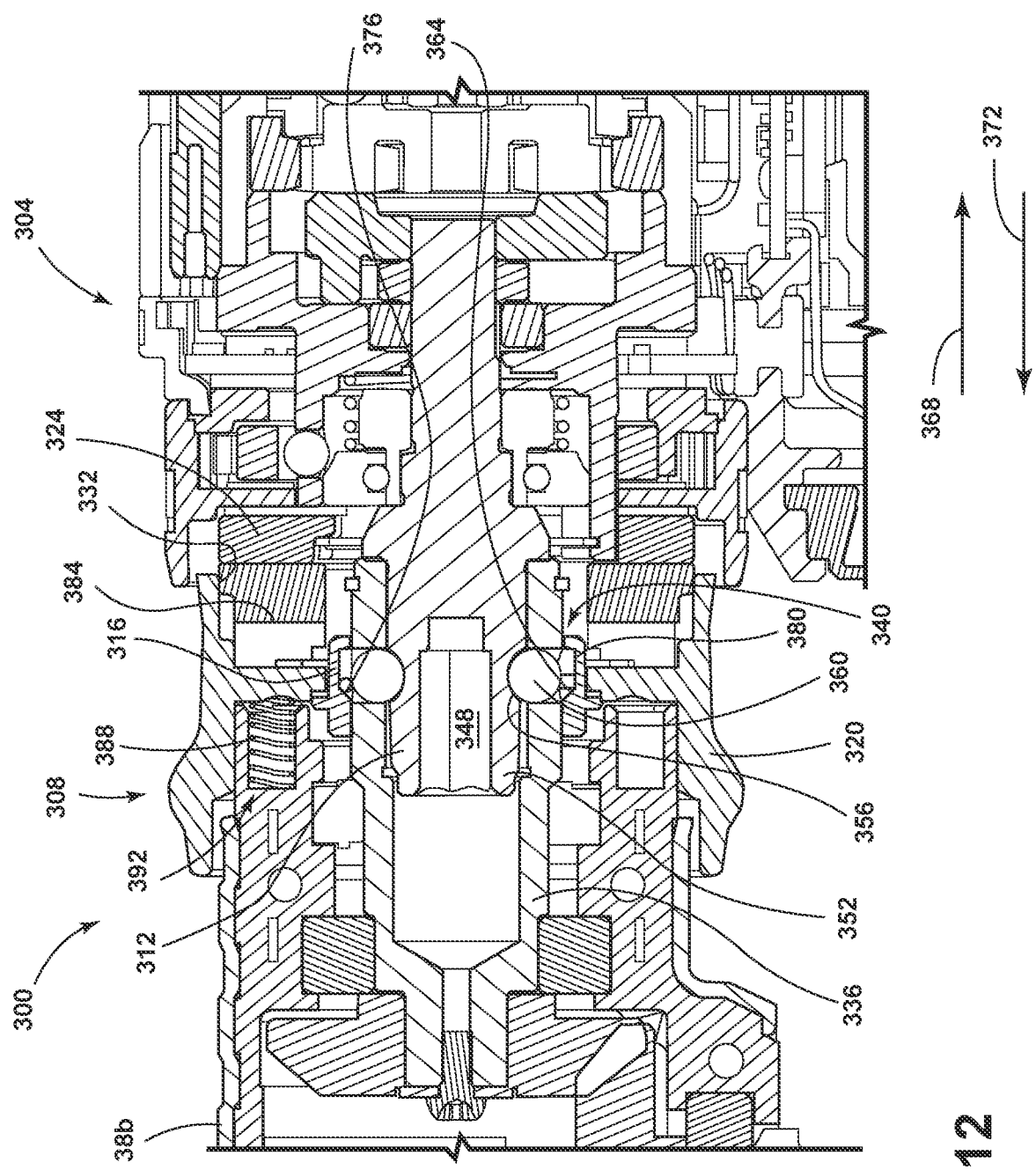
FIG. 12 is a cross-sectional view of the attachment mechanism of FIG. 8 taken along line 10-10 shown in FIG. 8 with the accessory in an axially and rotationally unlocked position relative to the power tool.

With reference to FIGS. 11-12, the inner sleeve 316 includes a cam surface 364 that selectively forces the ball detents 360 radially inward. The inner sleeve 316 is movable between a first direction 368 (FIG. 11), in which the cam surface 364 biases the ball detents 360 radially inward (i.e., a locked position), and a second direction 372 (FIG. 12), in which the cam surface 364 releases the ball detents 360 (i.e., an unlocked position). When the inner sleeve 316 and the ball detents 360 are in the locked position, the accessory 38*b* is axially locked relative to the power tool 10. In the illustrated embodiment, the inner sleeve 316 and the ball detents 360 are biased towards the locked position.

More specifically, the inner sleeve 316 extends circumferentially around the hub 336 carrying the ball detents 360. An inner surface 376 of the inner sleeve 316 forms an annular protrusion 380 extending radially inward to define the cam surface 364. The inner surface 376 also forms an annular recess 340, which allows the ball detents 360 to move radially outward when the ball detents 360 are aligned with the annular recess 340.

With continued reference to FIGS. 11-12, the outer sleeve 320 is generally cylindrical and extends circumferentially around the inner sleeve 316. The outer sleeve 320 is spaced away from the inner sleeve 316 to form a gap 392 between the inner sleeve 316 and the outer sleeve 320. The outer sleeve 320 includes an annular protrusion 384 extending towards the inner sleeve 316. A spring 388 is disposed within the gap 392. The spring 388 engages with the annular protrusion 384 to bias the outer sleeve 320 towards the first direction 368. The outer sleeve 320 is axially fixed to the inner sleeve 316 such that movement of the outer sleeve 320 causes movement of the inner sleeve 316. Accordingly, the bias of the outer sleeve 320 towards the first direction 368 biases the inner sleeve 316 towards the locked position. Similarly, movement of the outer sleeve 320 towards the second direction 372 releases the inner sleeve 316 from the locked position (i.e., release the ball detents 360 from engagement with the spindle 312).

In addition to releasing the inner sleeve 316 from the locked position, the outer sleeve 320 is configured to selectively enable or prohibit rotation of the accessory 38*b* relative to the power tool 10. Specifically, the second mating member 332 is integrally formed with the outer sleeve 320 and is configured to engage with the first mating member 324 on the power tool 10. The second mating member 332 includes a plurality of engagement elements 396*b* (FIG. 9) in the form of castellations. In the illustrated embodiment, the castellations are spaced around an inside surface of the outer sleeve 320 and extend radially inward. The first mating member 324 is a ring having a plurality of engagement elements 396*a* (FIG. 9) in the form of castellations extending radially outward. The castellations of the first mating member 324 are sized and shaped to correspond to the castellations on the second mating member 332. When the first mating member 324 and the second mating member 332 are engaged, the first mating member 324 and the second mating member 332 are rotationally fixed relative to one another, thereby rotationally fixing the accessory 38*b* to the power tool 10. In the illustrated embodiment, the spring 388 biases the outer sleeve 320 towards the rotationally locked position. In other embodiments, the first mating member 324 and the second mating member 332 include different types of engagement elements 396 capable of rotationally fixing the first mating member 324 relative to the second mating member 332.

With continued reference to FIGS. 11-12, the outer sleeve 320 is movable between a rotationally locked position, in which the accessory 38*b* is rotationally fixed relative to the power tool 10, and a rotationally unlocked position, in which the accessory 38*b* is freely rotatable relative to the power tool 10. FIG. 11 illustrates the outer sleeve 320 in the rotationally locked position. When in this position, the first mating member 324 and the second mating member 332 are engaged, thereby prohibiting rotation of the accessory 38*b*. FIG. 12 illustrates the outer sleeve 320 in the rotationally unlocked position. When in this position, the first mating member 324 is disengaged from the second mating member 332 of the accessory 38*b*, thereby allowing rotation of the accessory 38*b*. The outer sleeve 320 is biased towards the rotationally locked position. As previously mentioned, the spring 388 biases the outer sleeve 320 towards the first direction 368. This spring 388 bias locks the accessory 38*b* in both the axial and the rotational directions.

In operation, when no external forces are present, the accessory 38*b* is biased to a fully locked position where the accessory 38*b* is both axially and rotationally fixed relative to the power tool 10. To release the accessory 38*b* from the power tool 10, an operator slides the outer sleeve 320 in the second direction 372, which in turn, slides the inner sleeve 316 in the second direction 372. This releases the ball detents 360 from the spindle 312 and allows the accessory 38*b* to be removed from the power tool 10. Similarly, to rotate the accessory 38*b*, an operator slides the outer sleeve 320 in the second direction 372 to disengage the first mating member 324 and the second mating member 332, thereby enabling the accessory 38*b* to be rotated relative to the power tool 10.

FIGS. 13-16 illustrate a third embodiment of an attachment mechanism 400 configured to connect an accessory 38*c* to a power tool 10. The attachment mechanism 400 includes a tool-side attachment 404 and an accessory-side attachment 408. In the illustrated embodiment, the tool-side attachment 404 includes a spindle 412, a first mating member 424, and an inner sleeve 416. The accessory-side attachment 408 includes an outer sleeve 420, a plurality of ball detents 462, and a second mating member 432.

The spindle 412 includes a bore 448 formed by a spindle wall 452, where the bore 448 is sized and shaped to receive an input shaft 428 of a tool (e.g., a tool bit) or an input shaft 428 of accessory 38c (e.g., a drill chuck accessory) to be used with the power tool 10. In the illustrated embodiment, the bore 448 has a hexagonal cross section that corresponds to the input shaft 428. The spindle 412 includes one or more aperture 456 extending through the spindle wall 452 into the bore. A ball detent 460 is disposed within the aperture 456 to engage the input shaft 428 and lock the tool or accessory 38c to the nose 26 of the power tool 10. Specifically, the ball detent 460 can selectively engage with a recess 476 (see, FIG. 16) formed in the input shaft 428 of the tool or the accessory 38c in order to maintain the input shaft 428 within the bore 448 of the spindle 412. The ball detent 460 is movable between a first position (i.e., a locked position), in which the ball detent 460 is biased radially inward to engage the input shaft 428, and a second position (i.e., an unlocked position), in which the ball detent 460 is moved radially outward to release the input shaft 428. The ball detent 460 is biased towards the locked position by the inner sleeve 416.

Figure 15:
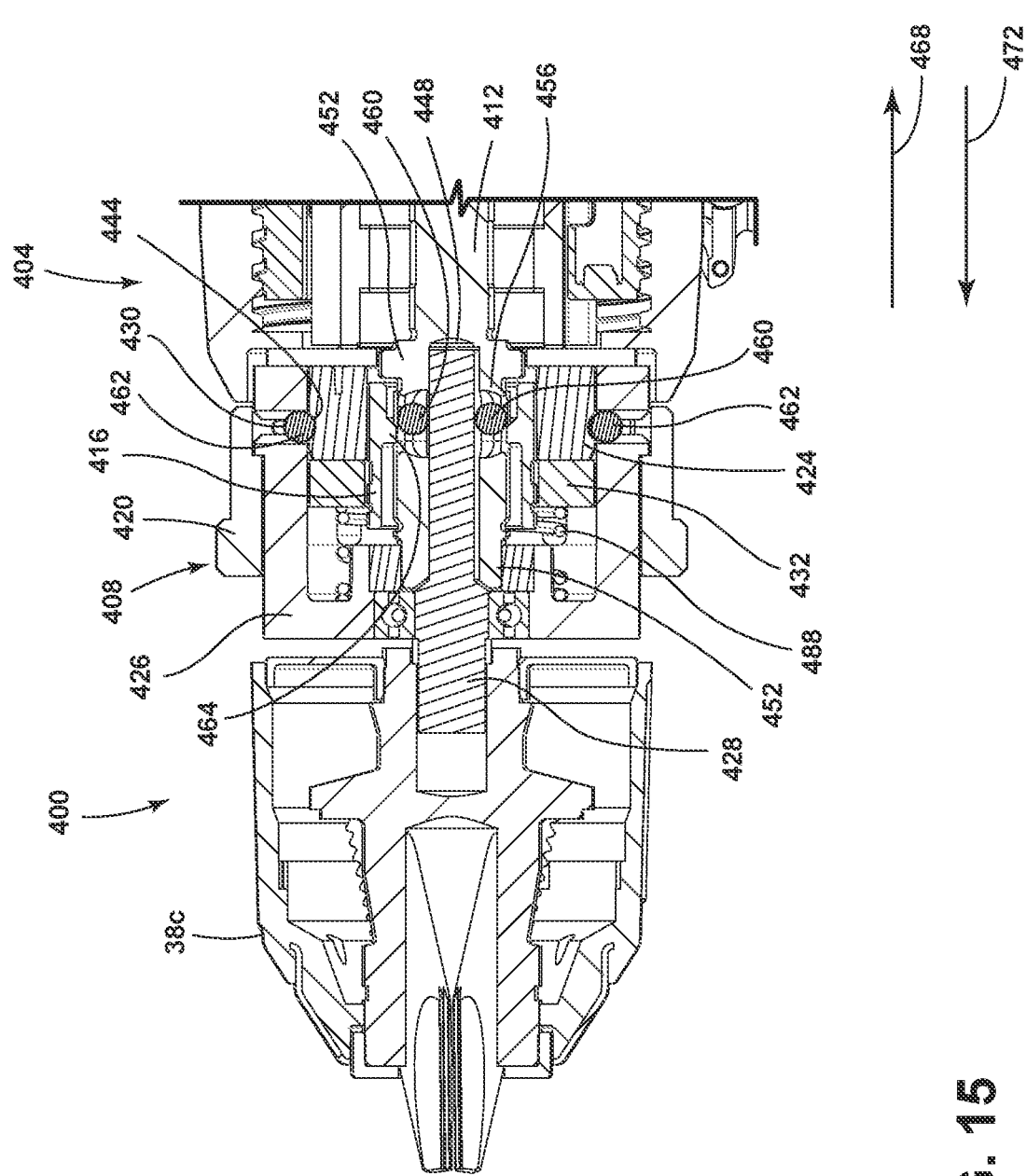
FIG. 15 is a cross-sectional view of the attachment mechanism of FIG. 13 taken along line 15-15 shown in FIG. 13 with the accessory in an axially and rotationally locked position relative to the power tool.
Figure 16:
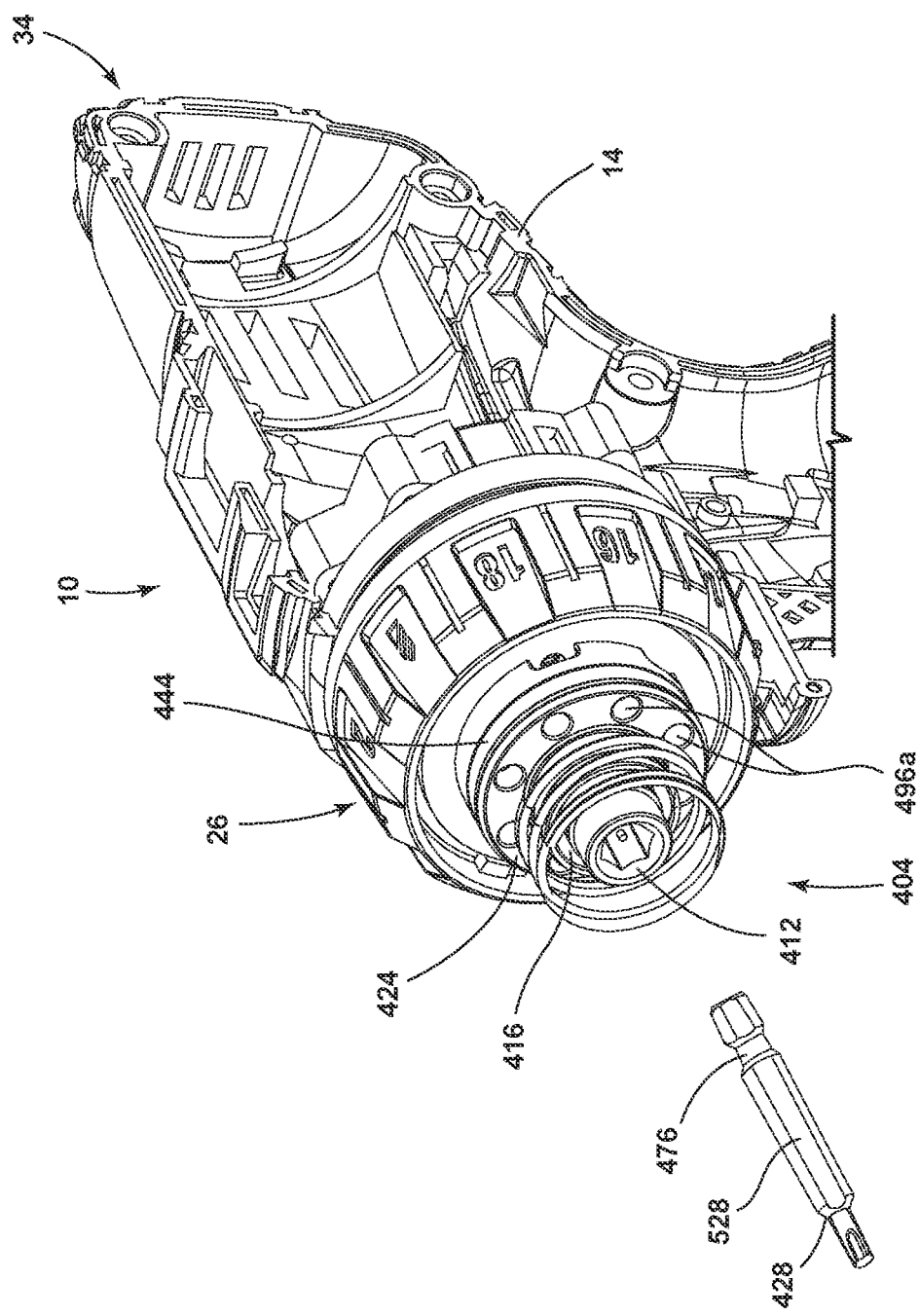
FIG. 16 is a perspective view of the power tool of FIG. 13 receiving a tool bit instead of an accessory.

With reference to FIGS. 15-16, the inner sleeve 416 includes a cam surface 464 that selectively forces the ball detent 460 radially inward. The inner sleeve 416 is movable in a first direction 468, towards the rear 34 of the power tool 10, in which the cam surface 464 biases the ball detent 460 radially inward (i.e., a locked position). The inner sleeve 416 is movable in a second direction 472, away from the rear 34 of the power tool 10, in which the cam surface 464 releases the ball detent 460 (i.e., an unlocked position). When the inner sleeve 416 and the ball detent 460 are in the locked position, the input shaft 428 (and thus the accessory 38c) is axially locked relative to the power tool 10. In the illustrated embodiment, the inner sleeve 416 and the ball detent 460 are biased towards the locked position. The inner sleeve 416 is unlocked by grasping the inner sleeve 416 and pulling the inner sleeve 416 in the second direction 472 to release the ball detent 460 from the recess of the input shaft 428. Notably, in some instances, an input shaft 428 of a tool or an accessory 38c may not include a recess 476 that can be engaged by the ball detent 460 (see, FIG. 15). In these cases, the tool and/or accessory 38c may be locked to the power tool 10 by other features of the attachment mechanism 400.

With continued reference to FIGS. 13-16, the outer sleeve 420 is generally cylindrical. In the illustrated embodiment, the outer sleeve 420 extends circumferentially around a hub 426 disposed on the accessory 38c. A plurality of ball detents 462 are carried by hub 326. The ball detents 462 are biased radially inward by a snap ring 430 (FIG. 15). The ball detents 462 are configured to engage with an annular recess 444 formed around an outer circumference of the first mating member 424. The engagement between the ball detents 462 and the first mating member 424 locks the accessory 38c to the power tool 10. Specifically, the engagement of the ball detents 462 with the annular recess 444 of the first mating member 424 axially locks the accessory 38c to the power tool 10 while enabling the accessory 38c to rotate relative to the power tool 10.

Figure 14:
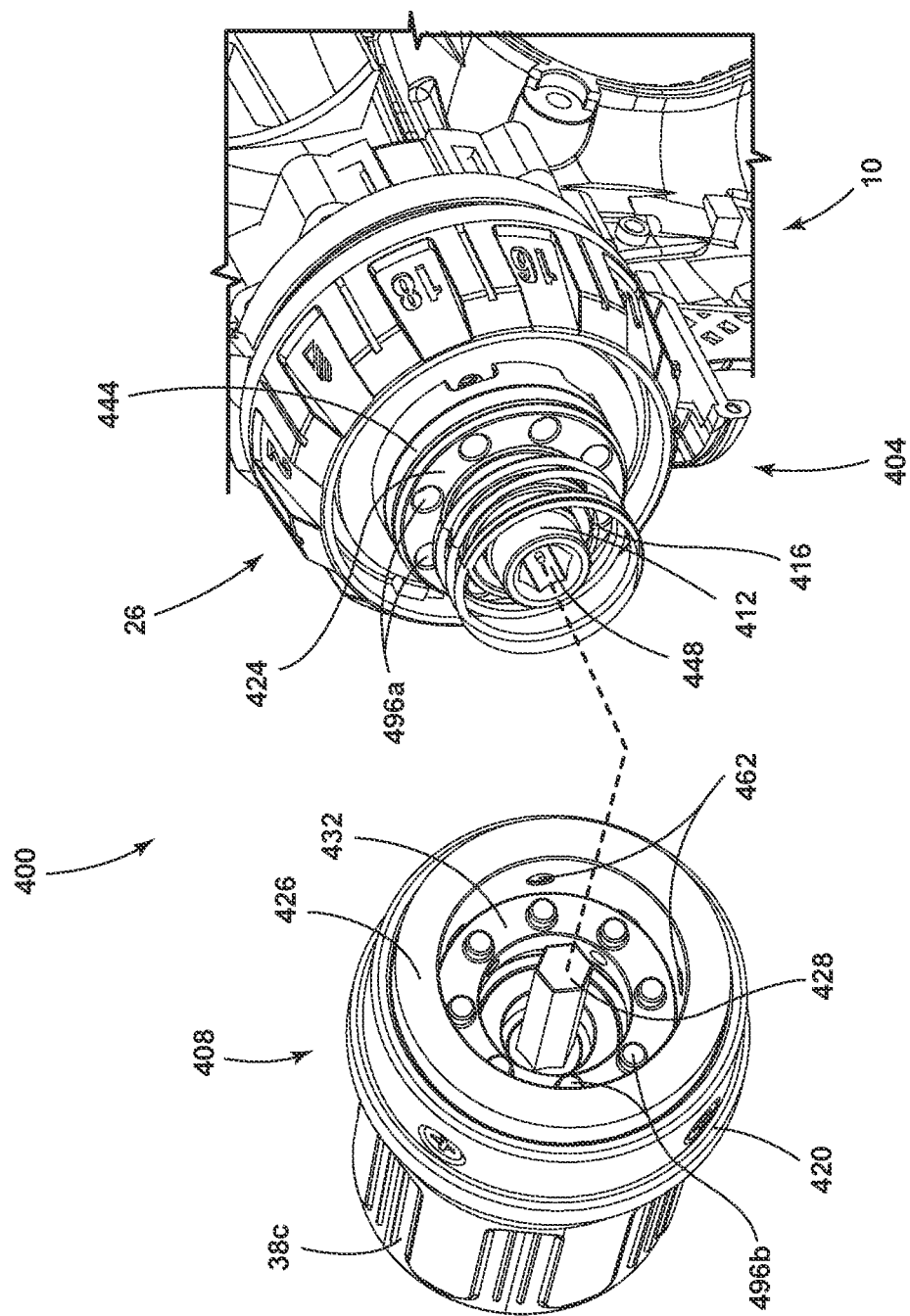
FIG. 14 is a perspective view of the attachment mechanism of FIG. 13 with the accessory disconnected from the power tool.

The first mating member 424 can help axially lock the accessory 38c to the power tool 10 as well as rotationally lock the accessory 38c to the power tool 10. As shown in FIG. 14, the first mating member 424 on the power tool 10 can engage with the second mating member 432 on the accessory 38c to rotationally fix the accessory 38c relative to the power tool 10. Specifically, the first mating member 424 includes a plurality of engagement elements 496a configured to engage with a plurality of engagement elements 496b on the second mating member 432. In the illustrated embodiment, the first mating member 424 is a ring including a plurality of engagement elements 496a in the form of recesses, which are spaced circumferentially on the first mating member 424. The second mating member 432 is a ring including a plurality of engagement elements 496b in the form of posts, which are spaced circumferentially on the second mating member 432. The recesses of the first mating member 424 are sized and shaped to receive the posts on the second mating member 432. When the first mating member 424 and the second mating member 432 are engaged, the accessory 38c is rotationally fixed relative to the power tool 10. In other embodiments, the first mating member 424 and the second mating member 432 include different types of engagement elements 496 capable of rotationally fixing the first mating member 424 relative to the second mating member 432.

The second mating member 432 is fixed to the outer sleeve 420 such that movement of the outer sleeve 420 causes movement of the second mating member 432. The outer sleeve 420 and the second mating member 432 are movable between a rotationally locked position, in which the accessory 38c is rotationally fixed relative to the power tool 10, and a rotationally unlocked position, in which the accessory 38c is freely rotatable relative to the power tool 10. The outer sleeve 420 is biased in a first direction 468, toward the rear 34 of the power tool 10, towards the rotationally locked position. Specifically, in the illustrated embodiment, a spring 488 is disposed within hub 326 and is oriented to bias the second mating member 432 towards the first mating member 424.

In operation, an operator attaches the accessory 38c to the power tool 10 by pushing, or "snapping," the accessory 38c onto the power tool 10 so that the ball detents 462 are forced into engagement with the annular recess 440 of the first mating member 424. Specifically, the operator provides an external force to overcome the force of the snap ring 430 so that the ball detents 462 are forced radially outward to a setback position with the hub 426. Once the accessory 38c is pushed far enough onto the power tool 10 so that the ball detents 462 align with the annular recess 444, the snap ring 430 will bias the ball detents 462 radially inward towards the annular recess 444 to lock the accessory 38c onto the power tool 10. Similarly, the remove the accessory 38c from the power tool 10, the operator pulls, or "snaps" off the accessory 38c from the power tool 10 so that the ball detents 462 are forced out of engagement with the annular recess 440 of the first mating member 424. To rotate the accessory 38c relative to the power tool 10, an operator slides the outer sleeve 420 in the second direction 472, to move the second mating member 432 in the second direction 472, against the biasing force of the spring 488. The operator then rotates the accessory 38c to the desired orientation and releases the outer sleeve 420. The biasing force of the spring 488 automatically rotationally locks the accessory 38c by biasing the second mating member 432 into engagement with the first mating member 424 on the power tool 10.

FIGS. 17-20 illustrate a fourth embodiment of an attachment mechanism 500 configured to connect an accessory 38d to a power tool 10. The attachment mechanism 500 includes a tool-side attachment 504 and an accessory-side attachment 508. In the illustrated embodiment, the tool-side attachment 504 includes a spindle 512 and a mating member 524. The accessory-side attachment 508 includes a hub 536 and a plurality of ball detents 560.

The spindle 512 includes an external hex 550 formed by the spindle wall 552. The external hex 550 is configured to be received by the hub 536. Specifically, the hub 536 includes a bore 544 with a hexagonal cross section that corresponds to the external hex 550 of the spindle 512. In addition, the spindle 512 includes an annular recess 540 extending circumferentially around the spindle 512. The annular recess 540 engages with the plurality of ball detents 560 on the accessory 38d. In other embodiments, the spindle 512 includes a plurality of apertures spaced circumferentially around the spindle 512 rather than a continuous annular recess 540.

Figure 19:
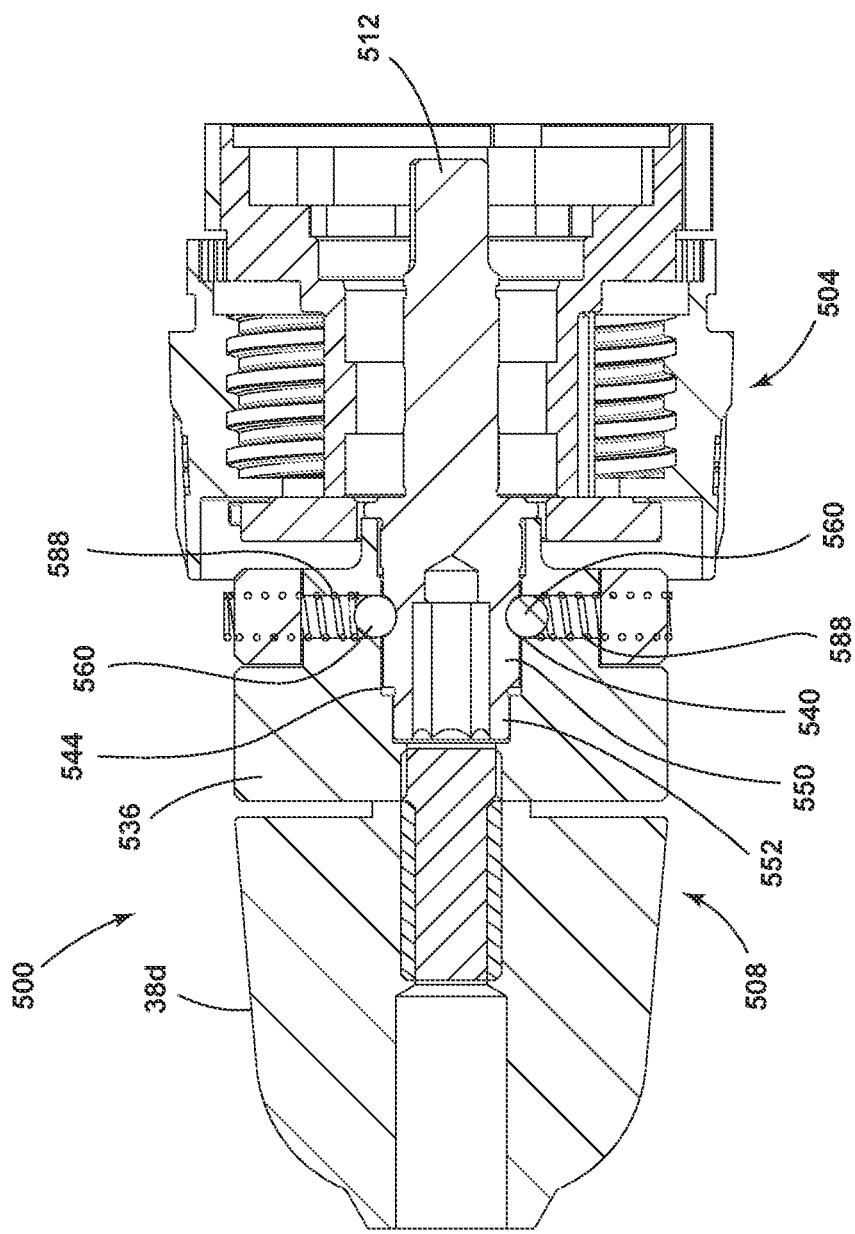
FIG. 19 is a cross-sectional view of the attachment mechanism of FIG. 17 taken along line 19-19 shown in FIG. 17 with the accessory in an axially locked and rotationally unlocked position relative to the power tool.
Figure 20:
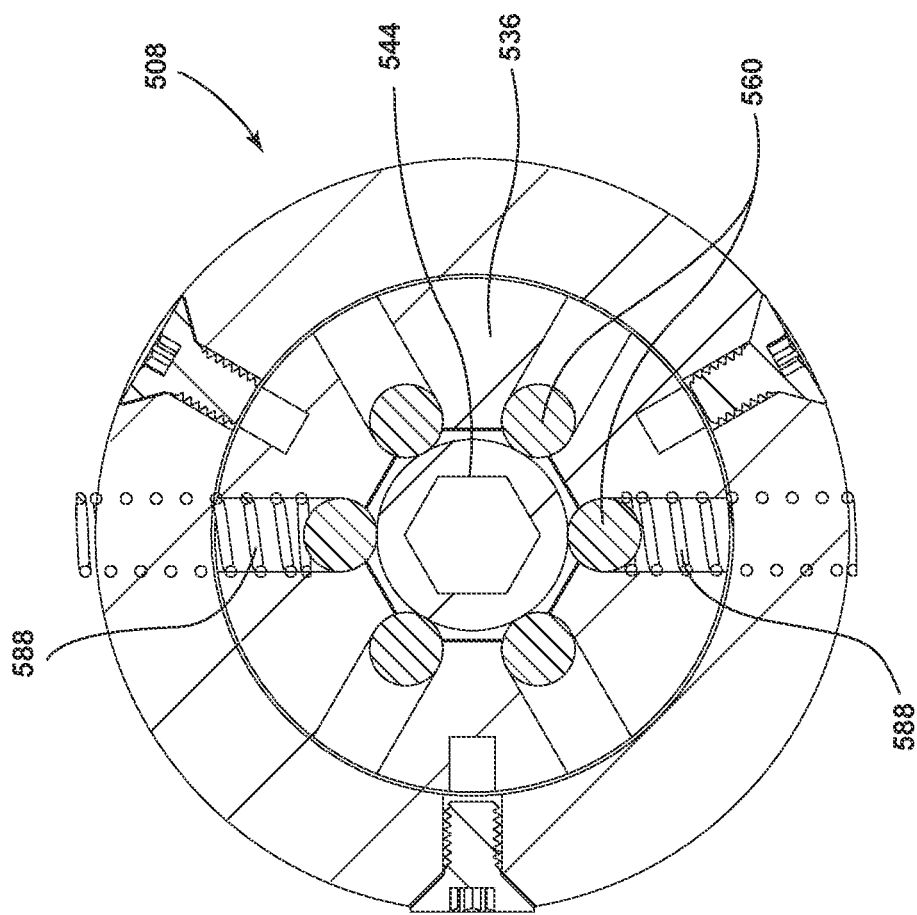
FIG. 20 is a cross-sectional view of the attachment mechanism of FIG. 17 taken along line 20-20 shown in FIG. 17.

The plurality of ball detents 560 are carried by a hub 536, which is positioned within the accessory 38d. The ball detents 560 of the hub 536 are configured to engage with the annular recess 540 formed around spindle 512. The engagement between the ball detents 560 and the annular recess 540 locks the accessory 38d to the power tool 10. In the illustrated embodiment, the hub 536 is generally cylindrical and forms a bore 544 that receives the spindle 512. When the spindle 512 is inserted into the bore 548, the annular recess 540 on the spindle 512 aligns with the ball detents 560 carried by the hub 536. As shown in FIGS. 19-20, the ball detents 560 are biased radially inward by a plurality of springs 588 in order to lock the accessory 38d to the power tool 10. In the illustrated embodiment, the ball detents 560 are configured to axially lock the accessory 38d to the power tool 10 while enabling rotational freedom of the accessory 38d relative to the power tool 10.

Additionally, the spindle 512 includes other engagement features that enable the spindle 512 to engage with other types of accessories 38 in addition to the accessory 38d illustrated in FIGS. 17-20. For example, the spindle 512 includes a bore 548 formed by a spindle wall 552, where the bore 548 is sized and shaped to receive an input shaft 528 of a tool (e.g., a tool bit shown in FIG. 16) or an accessory (e.g., an elbow attachment accessory) to be used with the power tool 10. In the illustrated embodiment, the bore 548 has a hexagonal cross section that corresponds to the input shaft 528. For example, the bore 548 is configured to receive the input shaft 528 of the tool bit shown in FIG. 16. The bore 548 is also configured to receive the input shaft 128, 328, 428 in another type of accessory 38 (e.g., an elbow accessory), as shown in the previous embodiments disclosed herein. Likewise, the mating member 524 disposed on the tool-side accessory 504 can be used to engage with various other accessories 38. The mating member 524 includes a plurality of engagement elements 596 in the form of castellations. As described in the embodiments above, the engagement elements 596 of the mating member 524 are configured to engage with engagement elements on mating members of other accessories 38.

In operation, an operator attaches the accessory 38d to the power tool 10 by pushing, or "snapping," the accessory 38d onto the power tool 10 so that the ball detents 560 are forced into engagement with the annular recess 540 of the spindle 512. Similarly, to remove the accessory 38d from the power tool 10, the operator pulls, or "snaps" off the accessory 38d from the power tool 10 so that the ball detents 560 are forced out of engagement with the annular recess 540 of the spindle 512.

Figure 32:
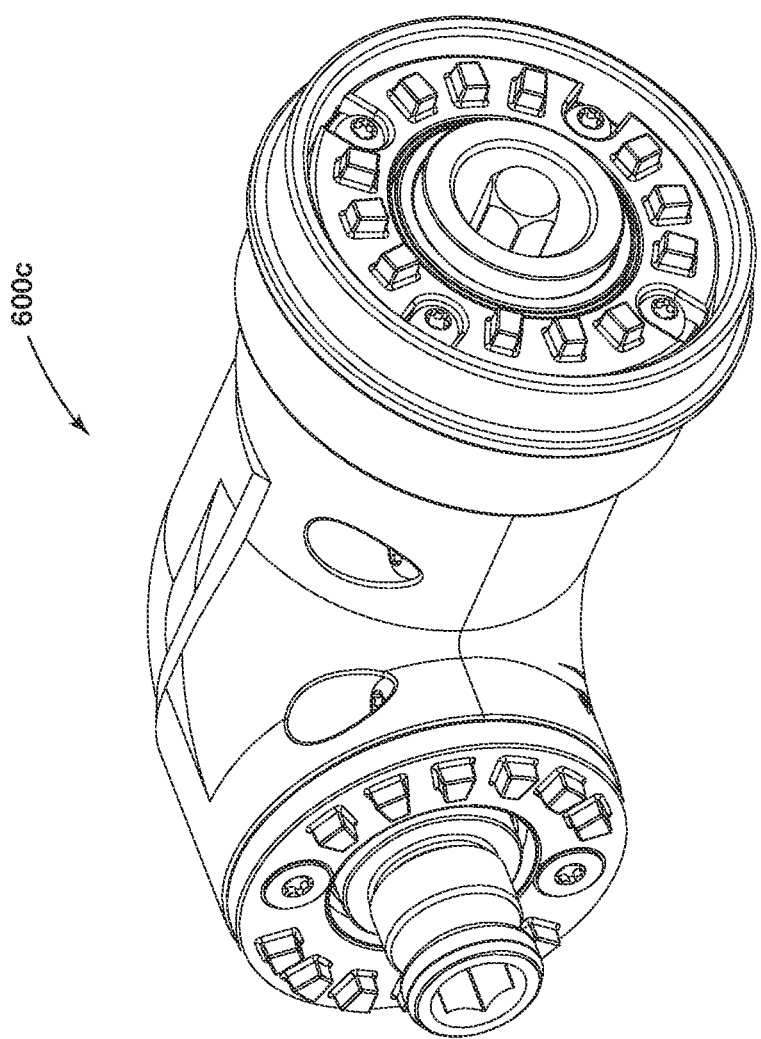
FIG. 32 is a perspective view of a right angle accessory including the same attachment mechanism as the hex attachment shown in FIGS. 22-31.

FIGS. 21-33 illustrate a fifth embodiment of an attachment mechanism 600 configured to connect an accessory 38 to a power tool 10. For example, the attachment mechanism 600 is shown with a hex accessory 38 in FIGS. 22-26, an offset accessory in FIG. 31, and a right angle accessory in FIG. 32. The attachment mechanism 600 includes a tool-side attachment 604, shown in FIG. 21, and an accessory-side attachment 608, shown in FIGS. 22-26. In the illustrated embodiment, the tool-side attachment 604 includes a spindle 612 and a first mating member 624. The accessory-side attachment 608 includes a sleeve 618, a cap 680, a hub 636, a plurality of ball detents 660, and a second mating member 632.

Figure 21:
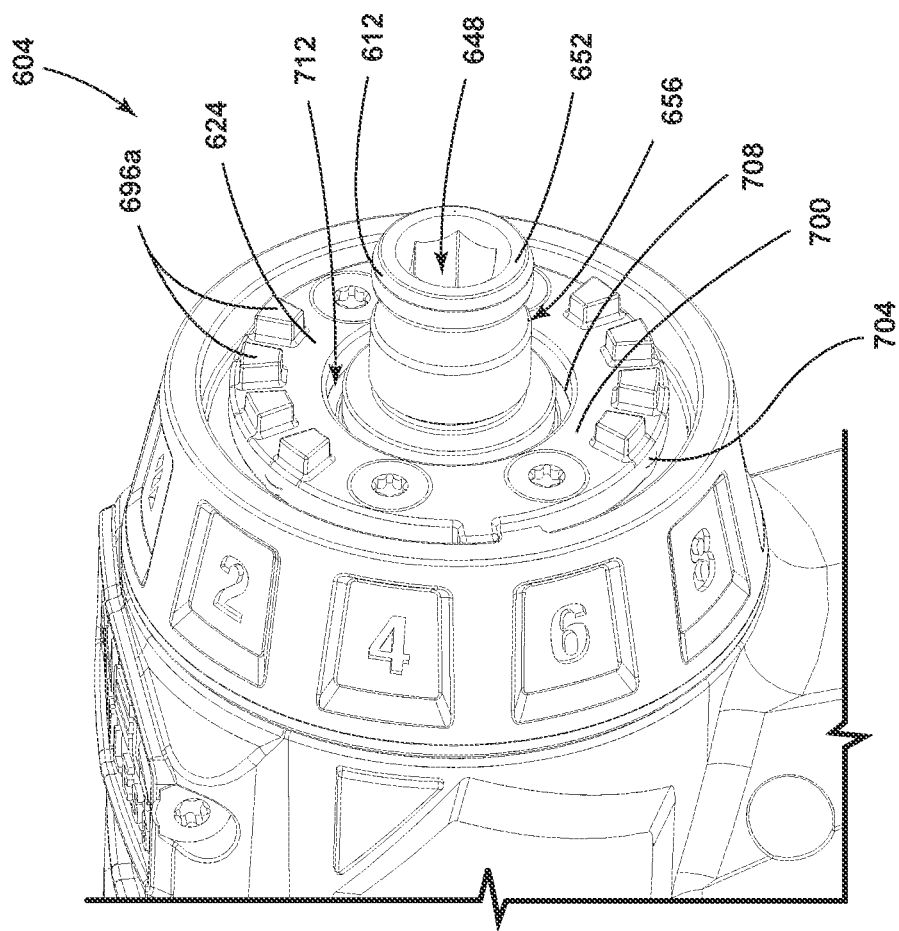
FIG. 21 is a perspective view of a tool-side attachment of a fifth embodiment of an attachment mechanism for coupling an accessory to a power tool.

Referring to FIG. 21, the spindle 612 includes a bore 648 formed by a spindle wall 652, where the bore 648 is sized and shaped to receive an input shaft of a tool (e.g., a tool bit) or an input shaft 628 of the accessory 38e to be used with the power tool 10. In the illustrated embodiment, the spindle 612 includes an annular recess 656 extending around the spindle wall 652 for receiving the ball detents 660 of the accessory-side attachment 608. In other embodiments, the spindle 612 may include a plurality of apertures in place of the annular recess 656 for receiving the ball detents 612.

In the illustrated embodiment, the first mating member 624 is formed as a disk having a face 700 and a surrounding outer circumference 704. The first mating member 624 also includes an opening 712 through which the spindle 612 can extend. The opening 712 is defined by an inner circumference 708 of the first mating member 624. The first mating member 624 includes a plurality of engagement elements 696a disposed on the face 700 and positioned between the inner circumference 708 and the outer circumference 704. In the illustrated embodiment, the engagement elements 696a are trapezoidal shaped teeth. In other embodiments, the engagement elements 696a may be other shapes and sizes. The engagement elements 696a may extend around the entire face 700 of the first mating member 624 or may only extend around portions thereof. In other embodiments, the first mating member 624 may not be a disk, but may instead be a different shape configured to support the engagement elements 696a. For example, in some embodiments, the first mating member 624 may be a ring with a plurality of engagement elements 696a supported along either an inner circumference 708 or an outer circumference 704.

With reference to FIGS. 22-26, the accessory-side attachment 608 includes the hub 636, which is formed by the input shaft 628 and an outer annular shaft 692 extending circumferentially around the input shaft 628. The ball detents 660 are carried by the hub 636. Specifically, the ball detents 660 are disposed within a plurality of orifices 664 in the annular shaft 692. When the accessory-side attachment 608 is engaged with the tool-side attachment 604, the input shaft 628 is received within the bore 644 of the spindle 612. The ball detents 660 are configured to engage with the plurality of annular recesses 656 in the spindle 612. The engagement between the ball detents 660 and the spindle 612 locks the accessory 38e to the power tool 10. The ball detents 660 are movable between a first position (i.e., a locked position), in which the ball detents 660 are biased radially inward to engage the spindle 612, and a second position (i.e., an unlocked position), in which the ball detents 660 are moved radially outward to release the spindle 612. The ball detents 660 are biased radially inward by the sleeve 618.

Figure 24:
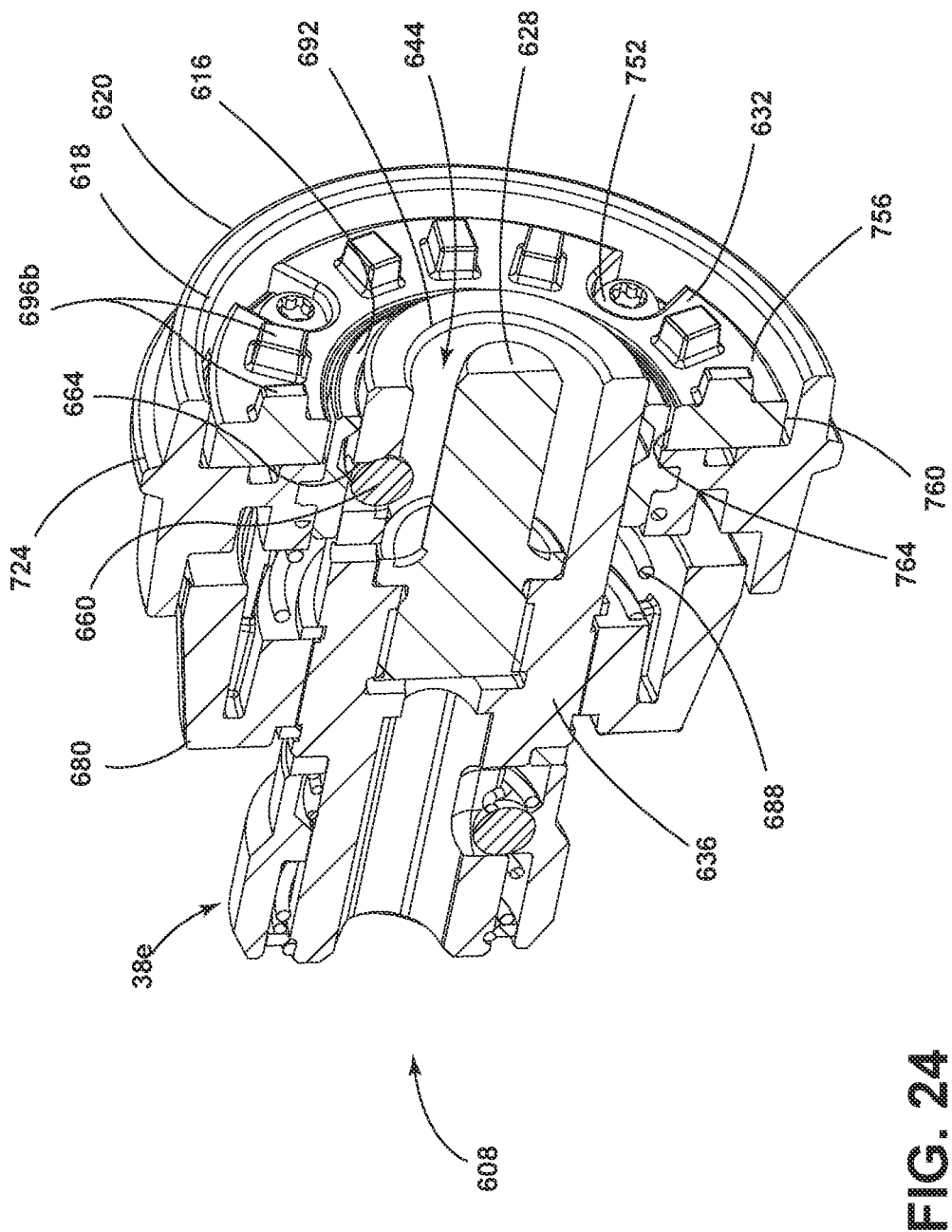
FIG. 24 is a cross-sectional view of the attachment mechanism of FIG. 2 taken along section line 24-24 in FIG. 22.
Figure 25:
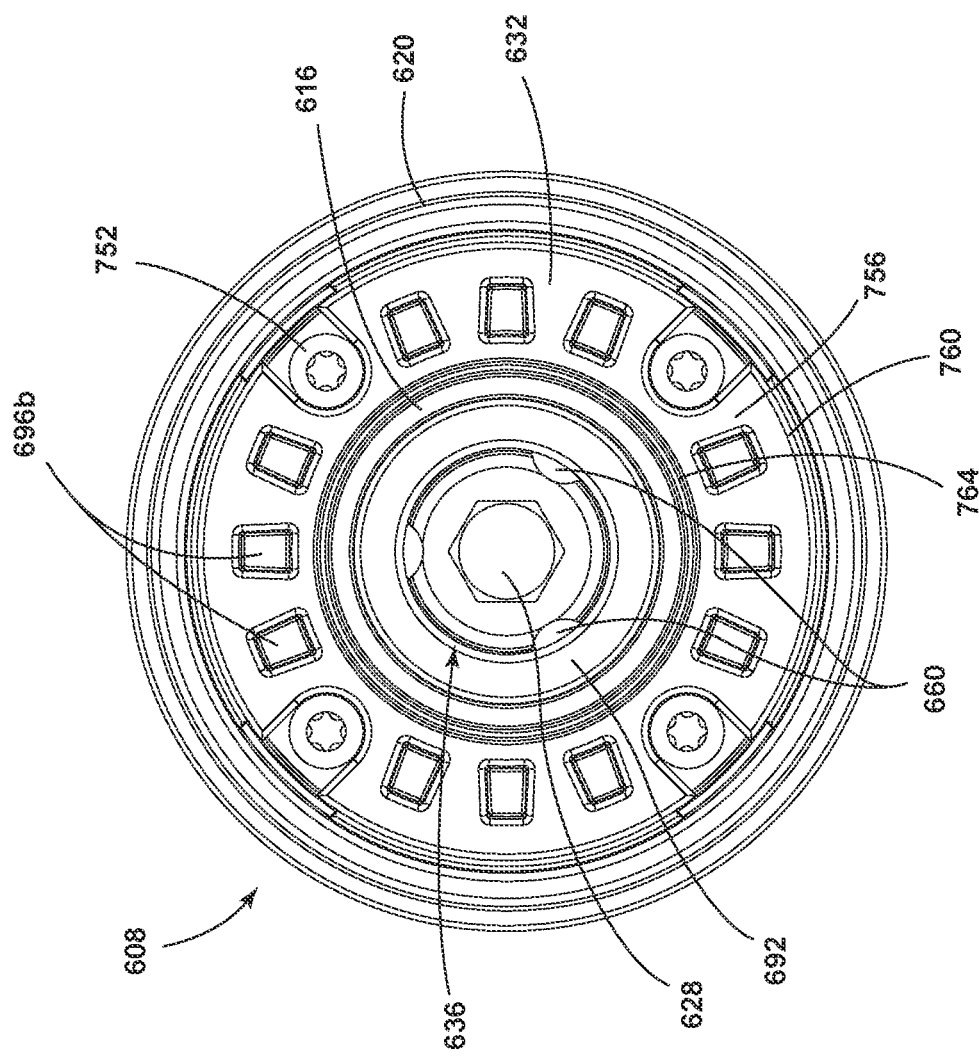
FIG. 25 is an end view of the attachment mechanism of FIG. 22.
Figure 26:
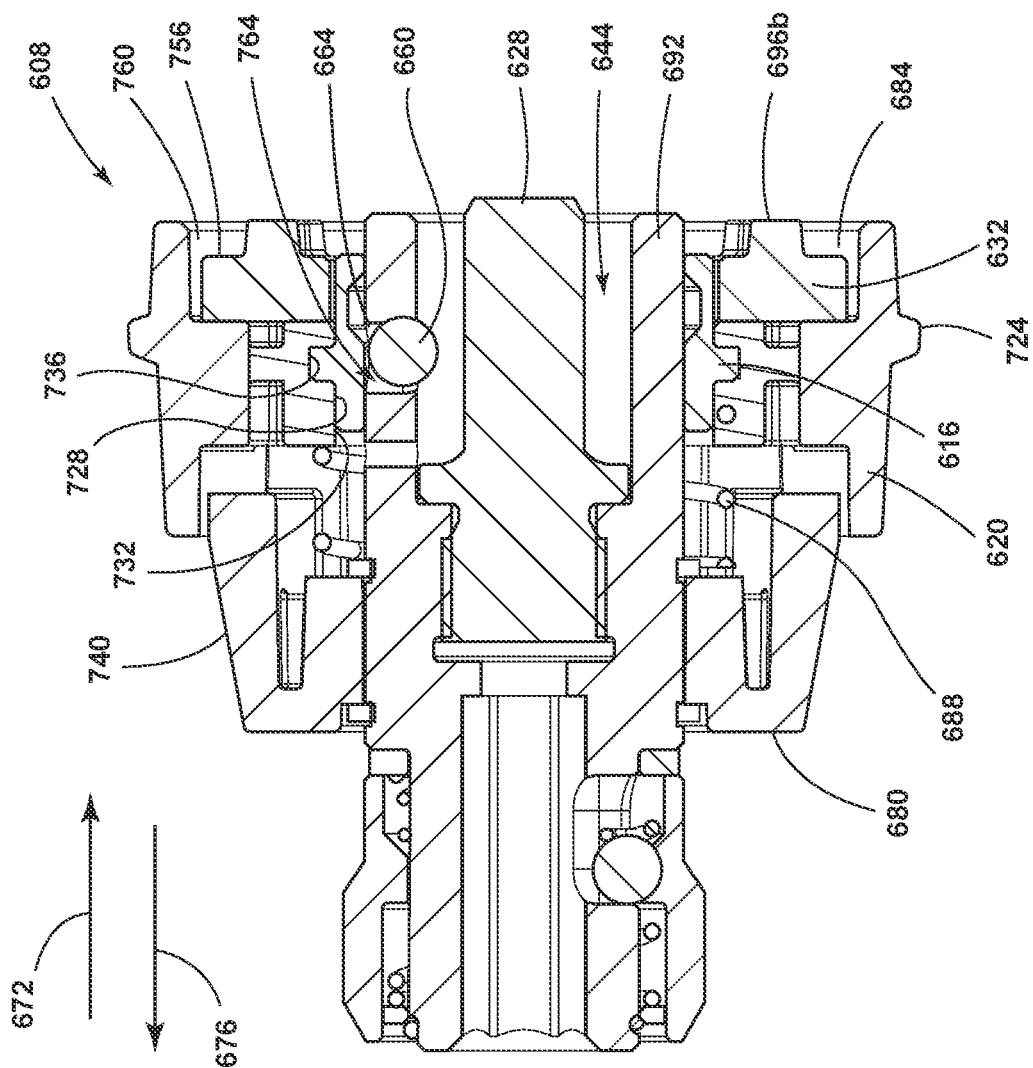
FIG. 26 is a cross-sectional view of the attachment mechanism of FIG. 22 taken along line 24-24 in FIG. 22.
Figure 28B:
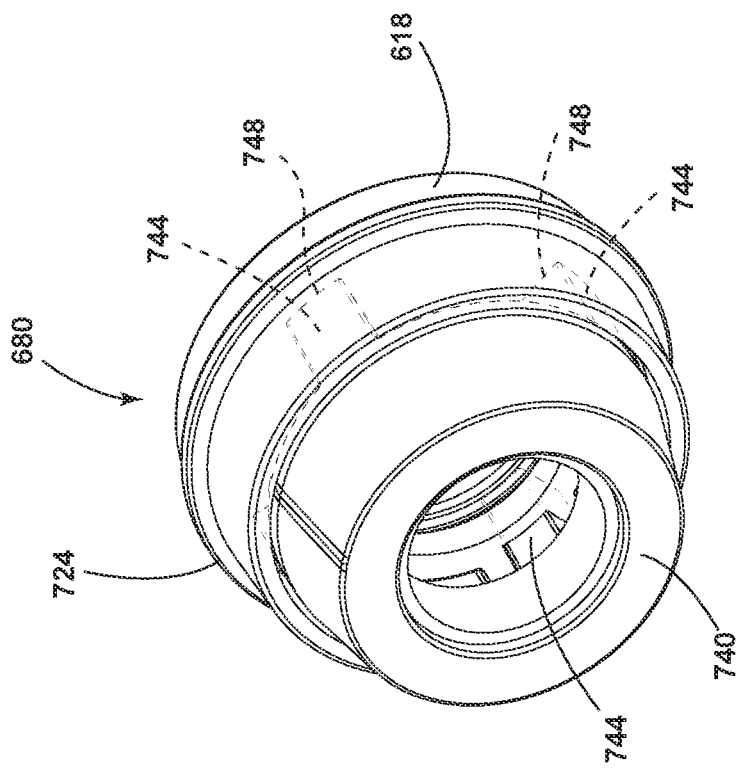
FIGS. 28A and 28B are front and rear perspective view of a cap of the attachment mechanism of FIG. 22.

Referring to FIGS. 24, 26, and 28, the accessory-side attachment 608 also includes the sleeve 618. The sleeve 618 extends circumferentially around the hub 636 carrying the ball detents 660. In the illustrated embodiment, the sleeve 618 includes and inner sleeve 616 and an outer sleeve 620. The outer sleeve 620 is generally cylindrical and extends circumferentially around the inner sleeve 616. The outer sleeve 620 is spaced away from the inner sleeve 616 to form a gap 684 between the inner sleeve 616 and the outer sleeve 620. The second mating member 632 is received within the gap 684.

The inner sleeve 616 and the outer sleeve 620 are fixed together by a plurality of ribs 716 extending radially between the inner sleeve 616 and the outer sleeve 620 (FIG. 27B). A plurality of apertures 720 are formed between the plurality of ribs 716. In some embodiments, the sleeve 618 includes a single aperture 720 formed between each part of adjacent ribs 716. In other embodiments, the space between some of the ribs 716 may be filled or partially filled, leaving an aperture 720 between only some pairs of adjacent ribs 716.

The outer sleeve 620 includes an annular grip 724 (FIG. 26) extending radially outward to assist in sliding the sleeve 618 between the first direction 672 and the second direction 676. A spring 688 biases the sleeve 618 towards the first direction 672. The outer sleeve 620 is axially fixed to the inner sleeve 616 such that movement of the outer sleeve 620 causes movement of the inner sleeve 616. Accordingly, the bias of the outer sleeve 620 towards the first direction 672 biases the inner sleeve 616 towards the locked position. Similarly, movement of the outer sleeve 620 towards the second direction 676 releases the inner sleeve 616 from the locked position (i.e., to release the ball detents 660 from engagement with the spindle 612).

With reference to FIGS. 27B, the inner sleeve 616 includes a cam surface 728 that selectively forces the ball detents 660 radially inward. The inner surface 732 also forms an annular recess 736, which allows the ball detents 660 to move radially outward when the ball detents 660 are aligned with the annular recess 736. The inner sleeve 616 is movable between the first direction 672 (FIG. 29), in which the cam surface 728 biases the ball detents 660 radially inward (i.e., a locked position), and a second direction 676 (FIG. 30), in which the cam surface 728 releases the ball detents 660 (i.e., an unlocked position). When the inner sleeve 616 and the ball detents 660 are in the locked position, the accessory 38e is axially locked relative to the power tool 10. In the illustrated embodiment, the inner sleeve 616 and the ball detents 660 are biased towards the locked position.

Figure 23:
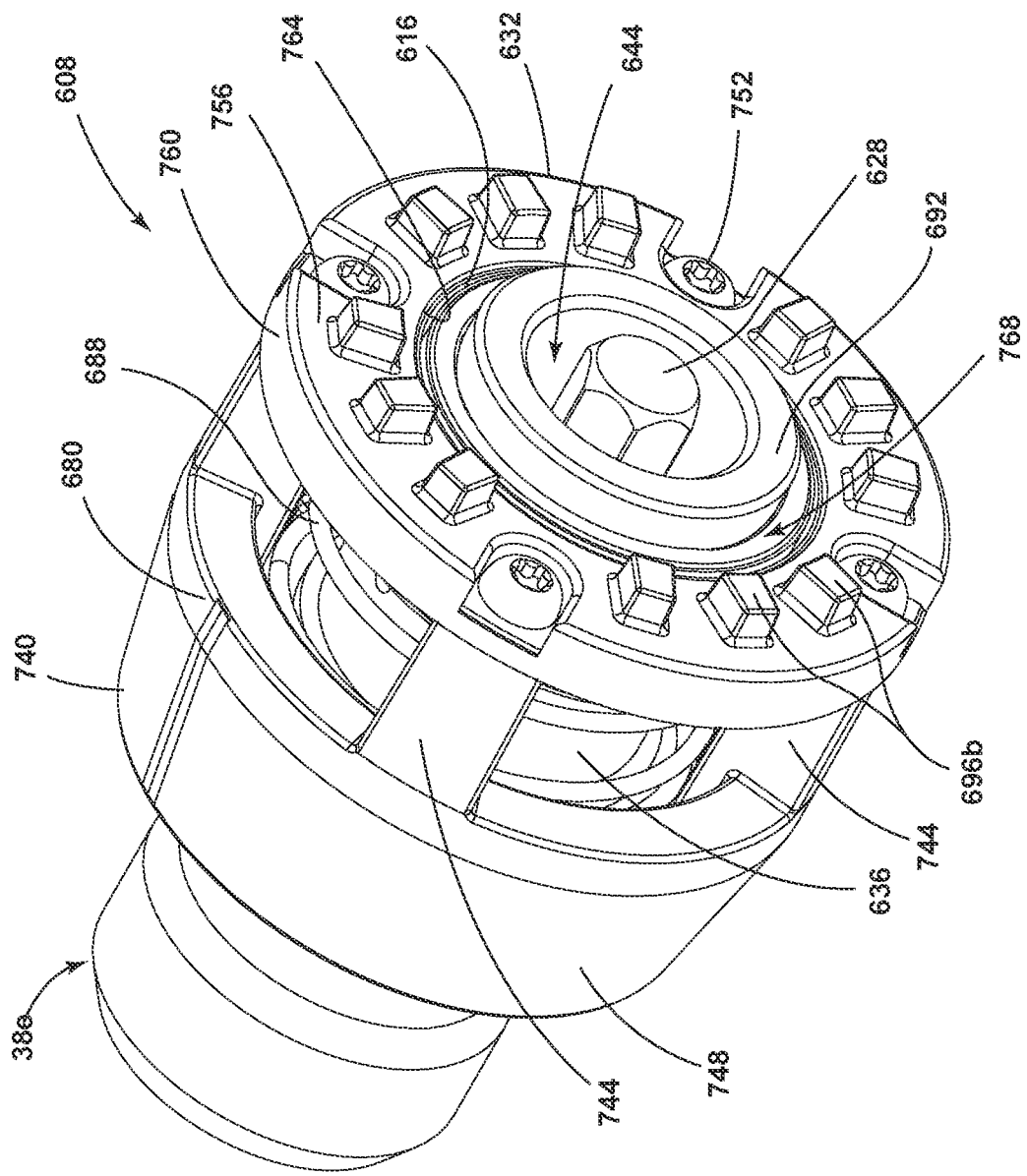
FIG. 23 is a perspective view of the attachment mechanism of FIG. 22 with a sleeve removed.

The sleeve 618 is movable between the first direction 672 and the second direction 676 by sliding along the cap 680. The cap 680 includes a main body 740 and a plurality of arms 744 extending from the main body 740 (FIG. 23). Specifically, in the illustrated embodiment, the main body 740 forms a portion of the outer housing of the accessory 38e. The size and shape of the main body 740 may vary greatly depending on the type of accessory (i.e., chuck, hex, elbow, off-set angle accessories). For example, the main body 740 of an offset angle accessory, as shown in FIG. 31, is sized and shaped differently from the main body 740 of the elbow accessory shown in FIG. 32 and the hex accessory 38 shown in FIG. 23. In each of these embodiments, a portion of the main body 740 forms a portion of the outer housing of the accessory 38e.

Figure 28A:
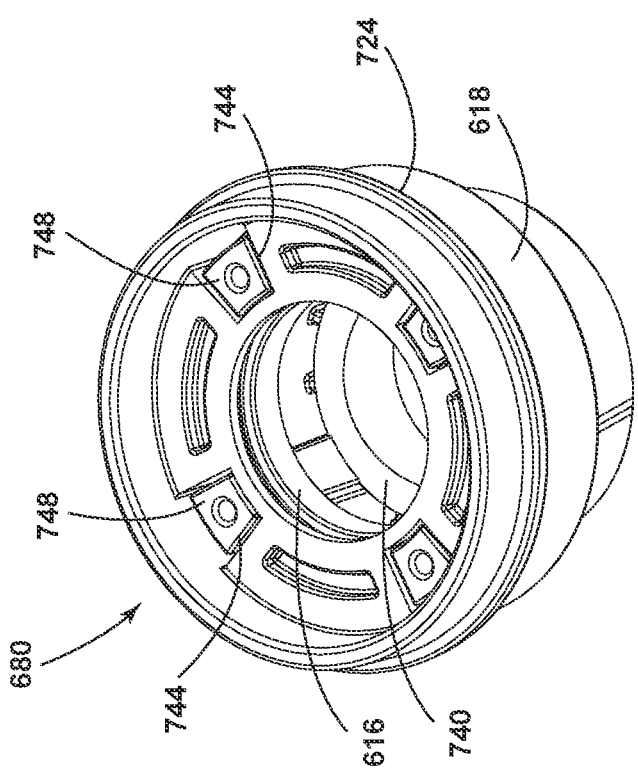

The arms 744 extend axially from the main body 740 to enable the sleeve 618 to slide axially along the cap 680. Specifically, the arms 744 extend through the apertures 720 in the sleeve 618 that are formed between the ribs 716. In the illustrated embodiment, the cap includes four arms 744 extending through four apertures 720 of the sleeve 618. However, in other embodiments, a greater or fewer number of arms 744 may be provided on the cap 680. With reference to FIGS. 23 and 28A, the second mating member 632 is coupled to the ends 748 of the arms 744. In the illustrated embodiment, the second mating member 632 is coupled to the cap 680 by a plurality of fasteners 752, such as screws. Accordingly, the second mating member 632 is fixed relative to the cap 680. As such, when the sleeve 618 slides along the arms 744 of the cap 680, the sleeve 618 moves relative to both the cap 680 and the second mating member 632. In addition, the second mating member 632 acts as a stop for limiting the extent to which the sleeve 618 is slidable in the first direction 672.

With continued reference to FIG. 23, the second mating member 632 is formed as a disk having a face 756 and a surrounding outer circumference 760. The second mating member 624 also includes an opening 768 through which the hub 636 can extend. The opening 768 is defined by an inner circumference 764 of the member 624. The second mating member 624 includes a plurality of engagement elements 696b disposed on the face 756 and positioned between the inner circumference 764 and the outer circumference 760. The engagement elements 696b of the second mating member 632 are sized and shaped to correspond to the engagement elements 696a on the first mating member 624. When the first mating member 624 and the second mating member 632 are engaged (i.e., with each engagement element 696b positioned), the first mating member 624 and the second mating member 632 are rotationally fixed relative to one another, thereby rotationally fixing the accessory 38e to the power tool 10. The accessory 38e can be rotationally unlocked by moving the accessory-side attachment 608 away from the tool-side attachment 604 to disengage the engagement elements 696a of the first mating member 624 from the engagement elements 696b of the second mating member 632.

In the illustrated embodiment, the engagement elements 696b are trapezoidal shaped teeth. In other embodiments, the engagement elements 696b may be other shapes and sizes capable of engaging with the engagement elements 696a of the first mating member 624. The engagement elements 696b may extend around the entire face 756 of the second mating member 624 or may only extend around portions. In other embodiments, the second mating member 624 may not be a disk, but may instead be a different shape configured to support the engagement elements 696b. For example, in some embodiments, the second mating member 624 may be a ring with a plurality of engagement elements 696b supported along either an inner circumference 764 or an outer circumference 760.

Figure 29:
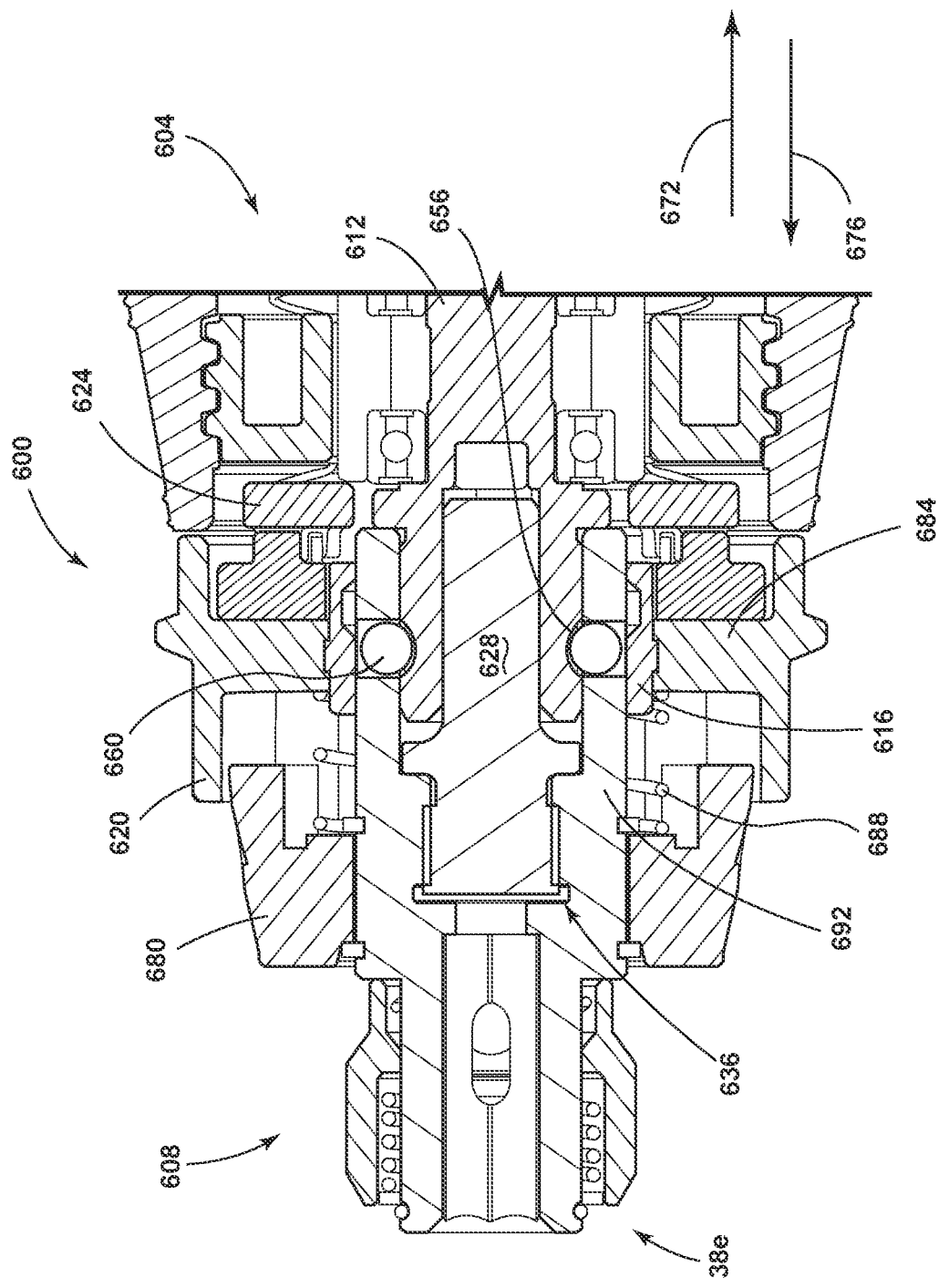
FIG. 29 is a cross-sectional view of the power tool of FIG. 21 connected to the attachment mechanism of FIG. 22 while in an axially and rotationally locked position.
Figure 30:
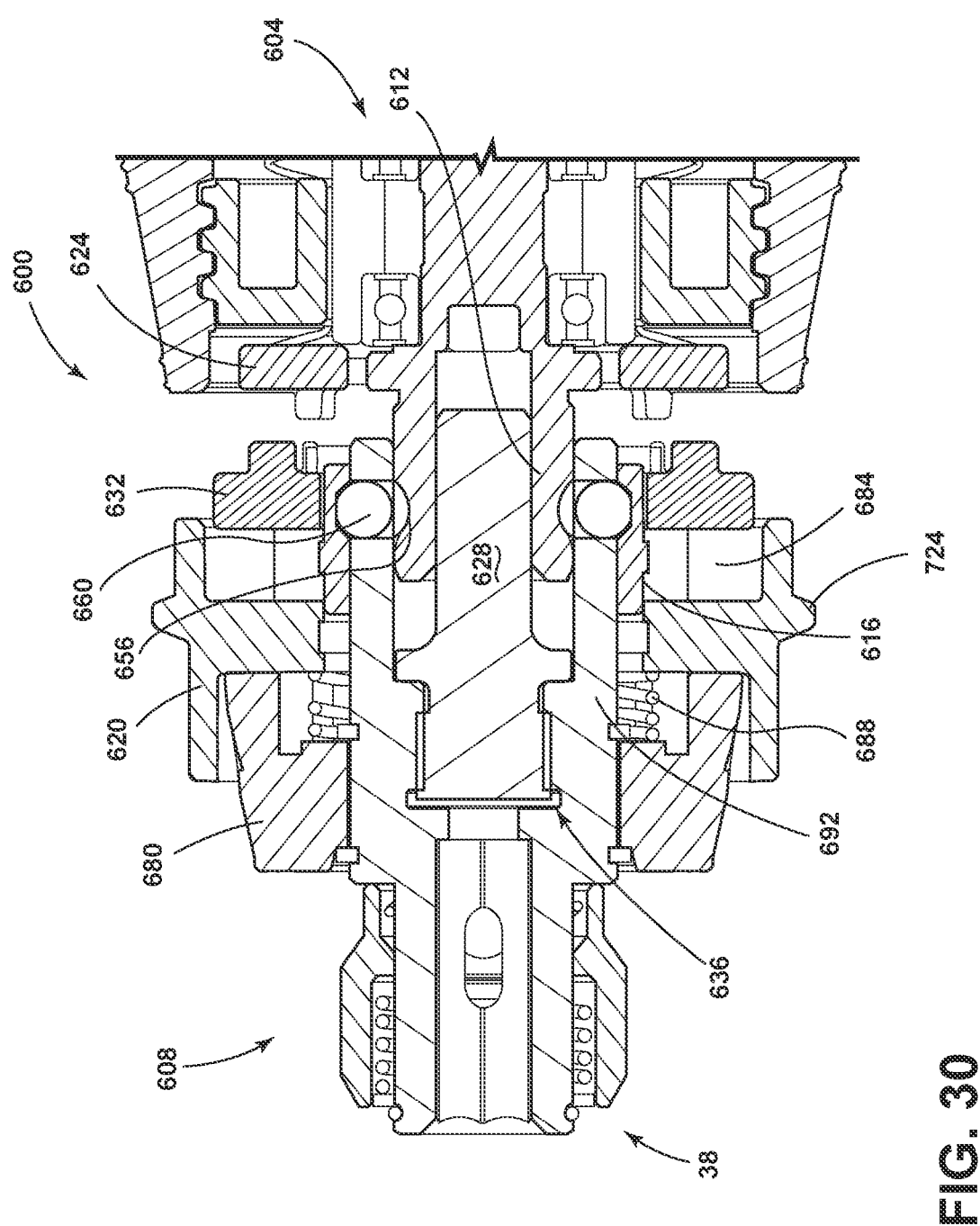
FIG. 30 is cross-sectional view of the power tool of FIG. 21 connected to the attachment mechanism of FIG. 22 with the sleeve moved to an unlocked position.

FIGS. 29-30 illustrate the attachment mechanism 600 with the accessory-side attachment 608 coupled to the tool-side attachment 604. In operation, when no external forces are present, the accessory 38e is biased to a fully locked position where the accessory 38e is both axially and rotationally fixed relative to the power tool 10. Specifically, the spring 688 biases the sleeve 618 of the accessory-side attachment 608 towards the tool-side attachment 604. When the sleeve 618 is in this position, the sleeve 618 pushes the ball detents 660 radially inward and into engagement with the annular recess 656 of the spindle 612 on the tool-side attachment 604. This axially locks the accessory 38e to the power tool. In addition, the accessory 38e is rotationally locked to the power tool 10 (i.e., rotationally fixed relative to the power tool 10). Specifically, the engagement elements 696a of the first mating member 624 are interlocked with the engagement elements 696b of the second mating member 632, which prevents rotation of the accessory 38e relative to the power tool 10. Accordingly, when the operator is using an asymmetric accessory 38e, such as a right angle accessory or an off-set accessory, the mating members 624, 632 enable the operator to position the accessory 38 at a desired orientation relative to power tool 10.

To release the accessory 38e from the power tool 10, an operator slides the outer sleeve 620 in the second direction 676, which in turn, slides the inner sleeve 616 in the second direction 676. This releases the ball detents 660 from the spindle 612 and allows the accessory 38e to be removed from the power tool 10. As the accessory-side attachment 608 is moved away from the tool-side attachment 604, the engagement members 696a, 696b disengage from one another and the accessory 38e be reoriented to a different position and reattached to the power tool 10, if desired.

Figure 34:
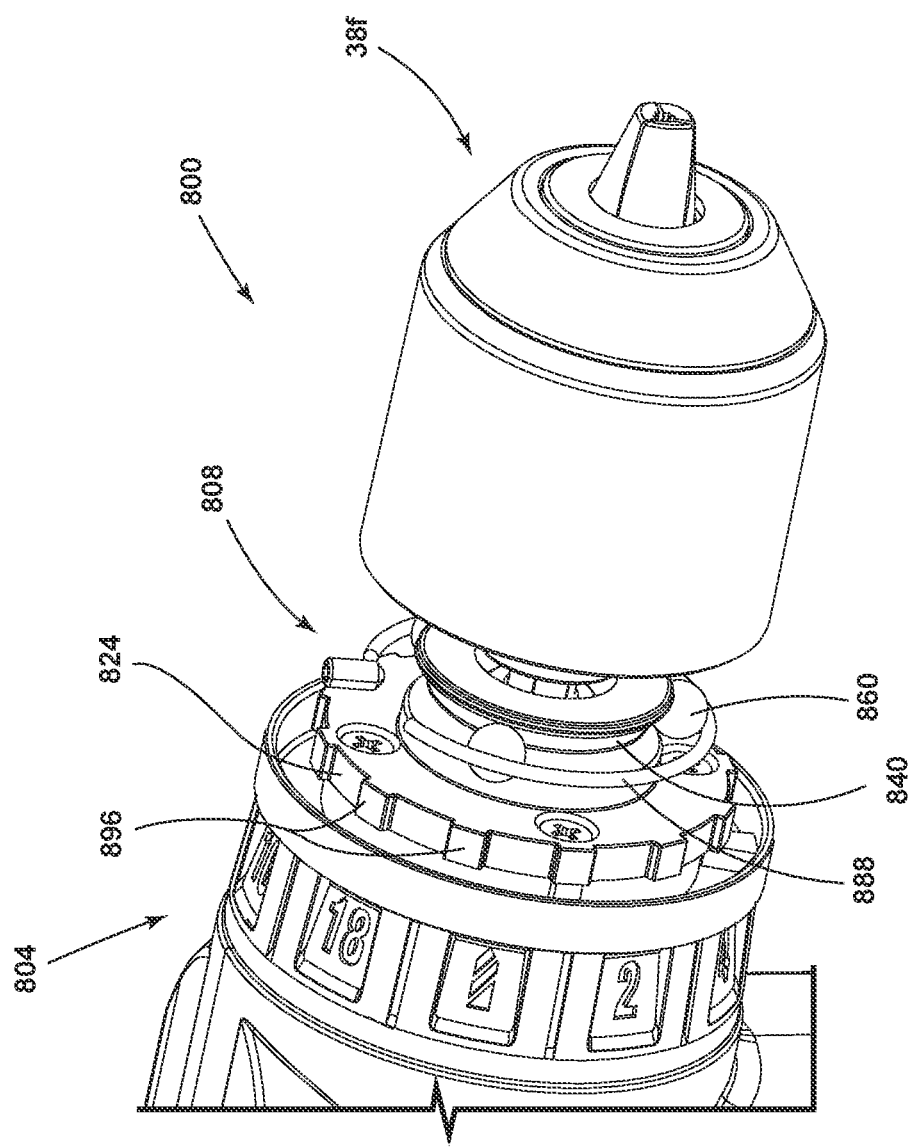
FIG. 34 is a perspective view of the attachment mechanism of FIG. 33 with the full collar removed.

FIGS. 33-34 illustrate a sixth embodiment of an attachment mechanism 800 configured to connect an accessory 38f to a power tool 10. In the illustrated embodiment, the accessory 38f is a chuck accessory. The attachment mechanism 800 includes a tool-side attachment 804 and an accessory-side attachment 808. In the illustrated embodiment, the tool-side attachment 804 includes a spindle 812 and a first mating member 824. The accessory-side attachment 808 includes an input shaft 828, a hub 836, one or more ball detent 860, and a biasing member 888.

The spindle 812 of the tool-side attachment 804 includes an internal hex 852 configured to receive the input shaft 828 of the accessory-side attachment 808. In the illustrated embodiment, the input shaft 828 has an external hex shape that aligns with the internal hex 852. Additionally, the first mating member 824 includes an annular recess 840 extending circumferentially around the first mating member 824. The annular recess 840 is configured to engage with the ball detents 860 on the accessory-side attachment 808. In some embodiments, the first mating member 824 includes a plurality of apertures spaced circumferentially around the first mating member 824 rather than a continuous annular recess 840.

The ball detents 860 are carried by the hub 836 of the accessory-side attachment 808. In the illustrated embodiment, the hub 836 is generally cylindrical and forms a bore 844 that receives the spindle 812. When the spindle 812 is inserted into the bore 844, the annular recess 840 on the spindle 812 aligns with the ball detents 860 in order to lock the accessory 38f to the power tool 10. As shown in FIG. 34, the ball detents 860 are biased radially inward by a biasing member 888. In the illustrated embodiment, the biasing member 888 is an annular biasing member 888, such as a spring clip or a retaining ring. The biasing member 888 is maintained in the hub 836 by a sleeve 818. In other embodiments, the biasing member may be a helical spring or other biasing member configured to bias the ball detents 860 radially inward. In the illustrated embodiment, the ball detents 860 are configured to axially lock the accessory 38f to the power tool 10 while enabling rotational freedom of the accessory 38f relative to the power tool 10. However, in other embodiments, the ball detents 860 may be configured to engage with apertures to rotationally fix the accessory 38 relative to the power tool 10.

Additionally, the first mating member 824 includes other engagement features that enable the power tool 10 to engage with other types of accessories 38 in addition to the chuck accessory 38f illustrated in FIGS. 33-35. For example, the first mating member 824 includes a plurality of engagement elements 896 in the form of castellations extending around the circumference of the matting member 824. As described in the embodiments above, the engagement elements 896 of the mating member 824 are configured to engage with engagement elements on mating members of other accessories 38f Specifically, the engagement elements 896 around the outer circumference of the first mating member 824 are configured to engage with engagement elements around an inner circumference or a front face of a second mating member (not shown) of an accessory 38.

In operation, an operator attaches the accessory 38f to the power tool 10 by pushing, or "snapping," the accessory 38f onto the power tool 10 so that the ball detents 860 are forced into engagement with the annular recess 840 of the spindle 812. In other words, a user exerts force sufficient to overcome the force of the biasing member 888 that biases the ball detents 860 radially inward. Similarly, to remove the accessory 38f from the power tool 10, the operator pulls, or "snaps" off the accessory 38f from the power tool 10 so that the ball detents 860 are forced out of engagement with the annular recess 840 of the spindle 812.

Figure 36:
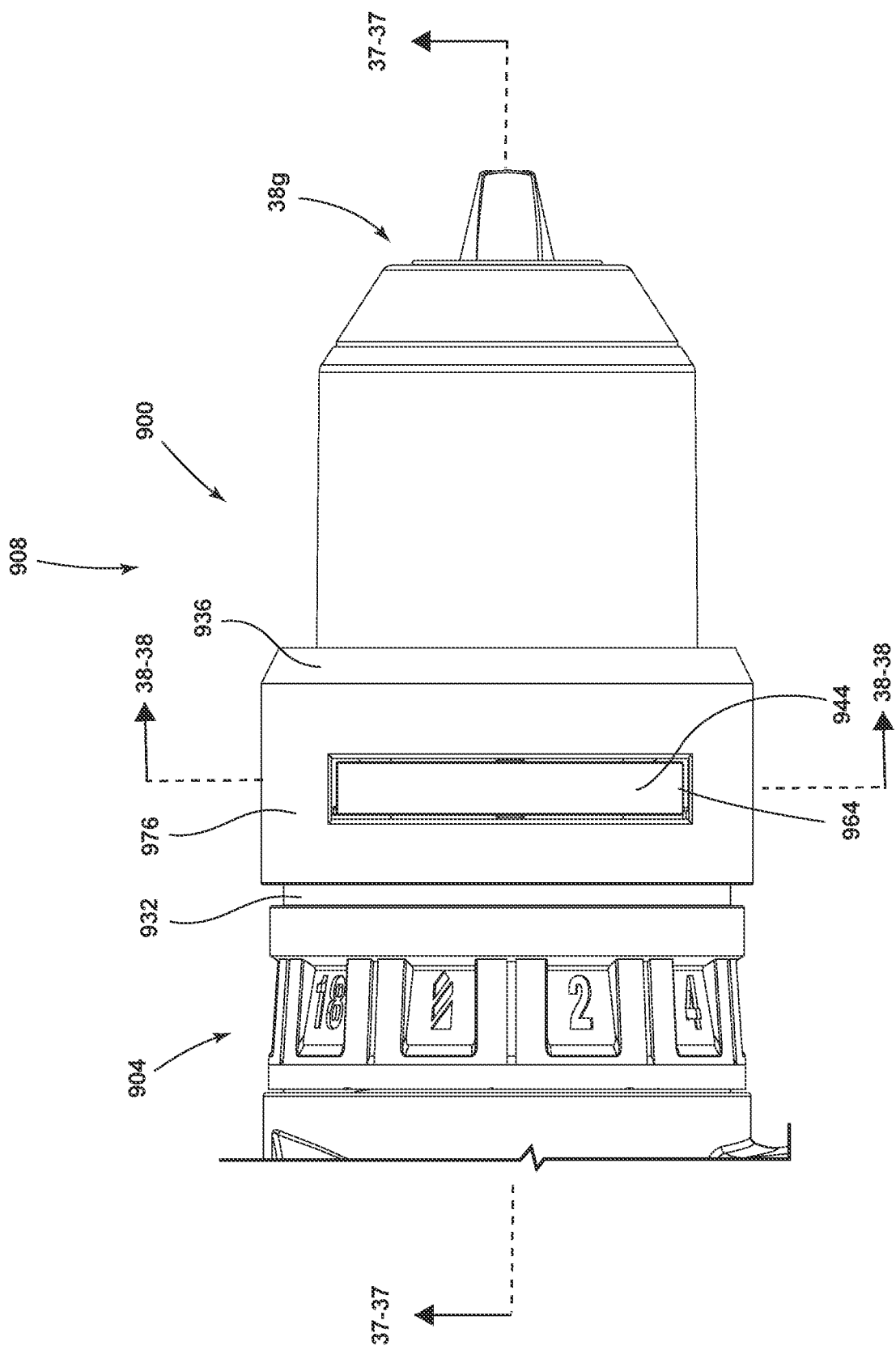
FIG. 36 is a side view of a seventh embodiment of an attachment mechanism for coupling an accessory to a power tool.
Figures 38A, 38B:
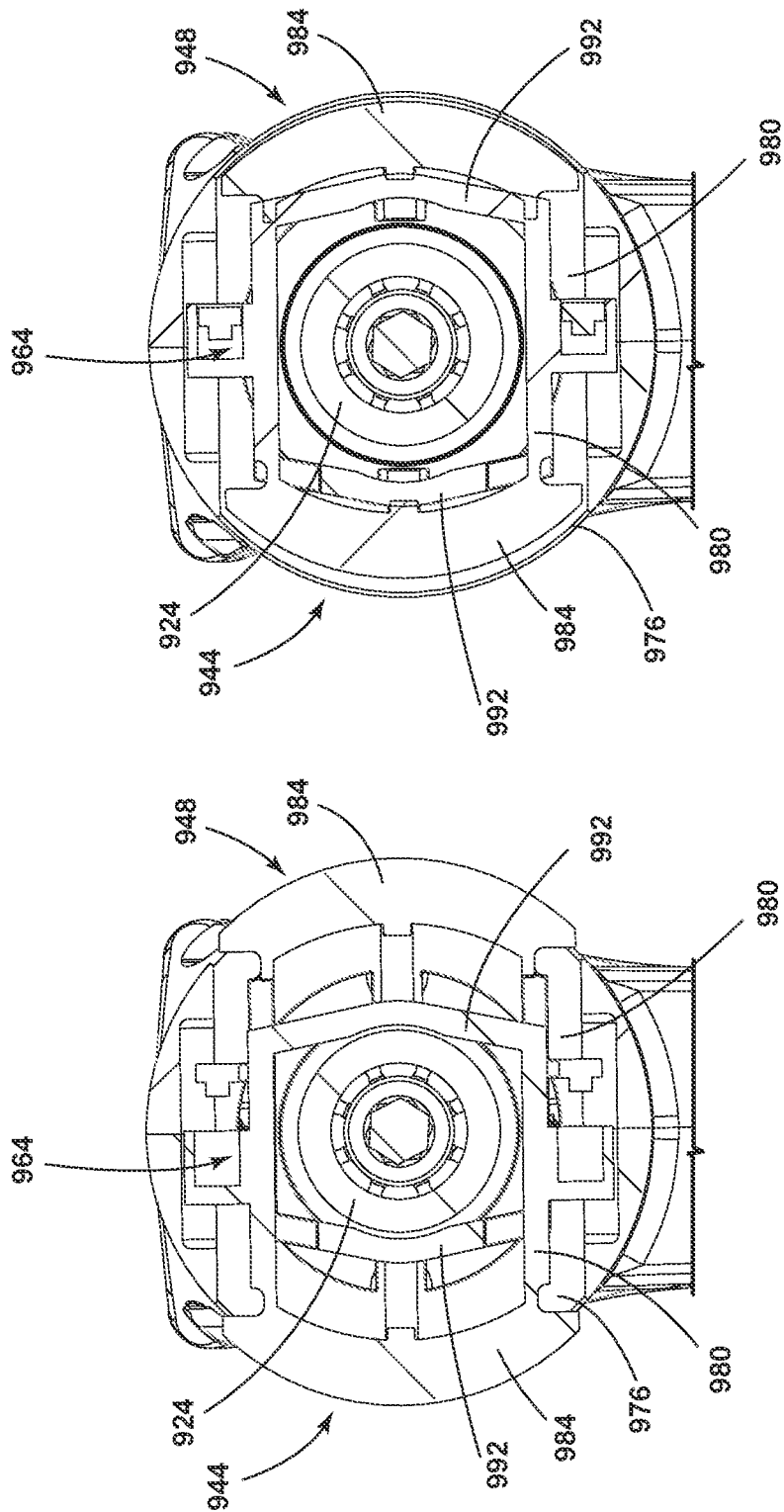
FIG. 38A is a cross-sectional view of the attachment mechanism of FIG. 36 taken along line 38-38 of FIG. 36 when in the locked position.
FIG. 38B is a cross-sectional view of the attachment mechanism of FIG. 36 taken along line 38-38 of FIG. 36 when in the unlocked position.

FIGS. 36-38 illustrate a seventh embodiment of an attachment mechanism 900 configured to connect an accessory 38g to a power tool 10. In the illustrated embodiment, the accessory 38g is a chuck accessory. The attachment mechanism 900 includes a tool-side attachment 904 and an accessory-side attachment 908. In the illustrated embodiment, the tool-side attachment 904 includes a spindle 912 and a first mating member 924. The accessory-side attachment 908 includes an input shaft 928, a hub 936, a second mating member 932, and a clamping mechanism 964.

The spindle 912 of the tool-side attachment 904 includes an internal hex 952 configured to receive the input shaft 928 of the accessory-side attachment 908. In the illustrated embodiment, the input shaft 928 has an external hex shape that aligns with the internal hex 952. Additionally, the first mating member 924 includes an annular recess 940 extending circumferentially around the first mating member 924. The annular recess 940 is configured to engage with the clamping mechanism 964 on the accessory-side attachment 908.

The clamping mechanism 964 can selectively axially lock the accessory 38g to the power tool 10. The clamping mechanism 964 includes a first clamp member 944 and a second clamp member 948 positioned on opposing sides of the hub 936. Each of the clamp members 944, 948 includes a gripping member 980 and an actuation element 984. The gripping members 980 are U-shaped and extend from each end of the respective actuation element and around the first mating member 924. The clamp members 944, 948 are supported by the hub 936 with the actuation elements 984 extending through a hub wall 976 such that a operator can engage the actuation elements 984. Specifically, the actuation elements 984 are positioned on radially opposite ends of the hub 936 and are configured to be squeezed (i.e., actuated) radially inward towards one another. The gripping members 980 of each clamp member extend from the respective actuation member and around the annular recess 940 of the first mating member 924.

The gripping members 980 of the clamp members 944, 948 can selectively engage the annular recess 940 of the spindle to axially lock the accessory 38g to the power tool 10. Specifically, in the illustrated embodiment, the gripping members 980 have curved ends 992 to help engage the annular recess 940.

The clamp members 944, 948 are biased radially outward towards a locked position. When the clamp members 944, 948 are in a locked position, the curved ends 992 of the gripping members 980 engage the annular recess 940 of the spindle 912 to axially lock the accessory 38g to the power tool 10. A operator can squeeze the clamp members 944, 948 towards one another to disengage the curved ends 992 of the gripping members 980 from the annular recess 940 of the spindle 912, and thereby unlock the accessory 38g from the power tool 10.

Additionally, the first mating member 924 and the second mating member 932 may rotationally lock the accessory 38g so that the accessory 38g is rotationally fixed relative to the power tool 10. Specifically, the first mating member 924 includes a plurality of engagement elements extending around the circumference of the first matting member 924. The engagement elements of the first mating member 924 are configured to engage with engagement elements around an inner circumference or a front face of a second mating member 932 of an accessory 38g. In the illustrated embodiment, the engagement elements are in the form of castellations, however, in other embodiments, the engagement elements can be a different form. In the illustrated embodiment, the second matting member 932 is integral with the hub 936 such that the engagement elements extend from an end of the hub 936. In other embodiments, the second mating member 932 may be a separate element from the hub 936.

In operation, an operator attaches the accessory 38g to the power tool 10 by squeezing the actuation elements 984 of the clamp members 944, 948 towards one another. When the clamp members 944, 948 move radially inward, the arms 980 of each clamp member disengage from the annular recess 940 of the spindle 912 to unlock the accessory 38g such that it can be removed from the power tool 10. The accessory 38g can then be rotated to a desired position and reattached to the power tool 10. When the clamp members 944, 948 are release, biasing members (not shown) bias the clamp members 944, 948 radially outward and away from one another. When the clamp members 944, 948 are moved radially outward, the arms 980 of each clamp member engage with the annular recess 940 to axially lock the accessory 38g to the power tool 10.

Figure 39:
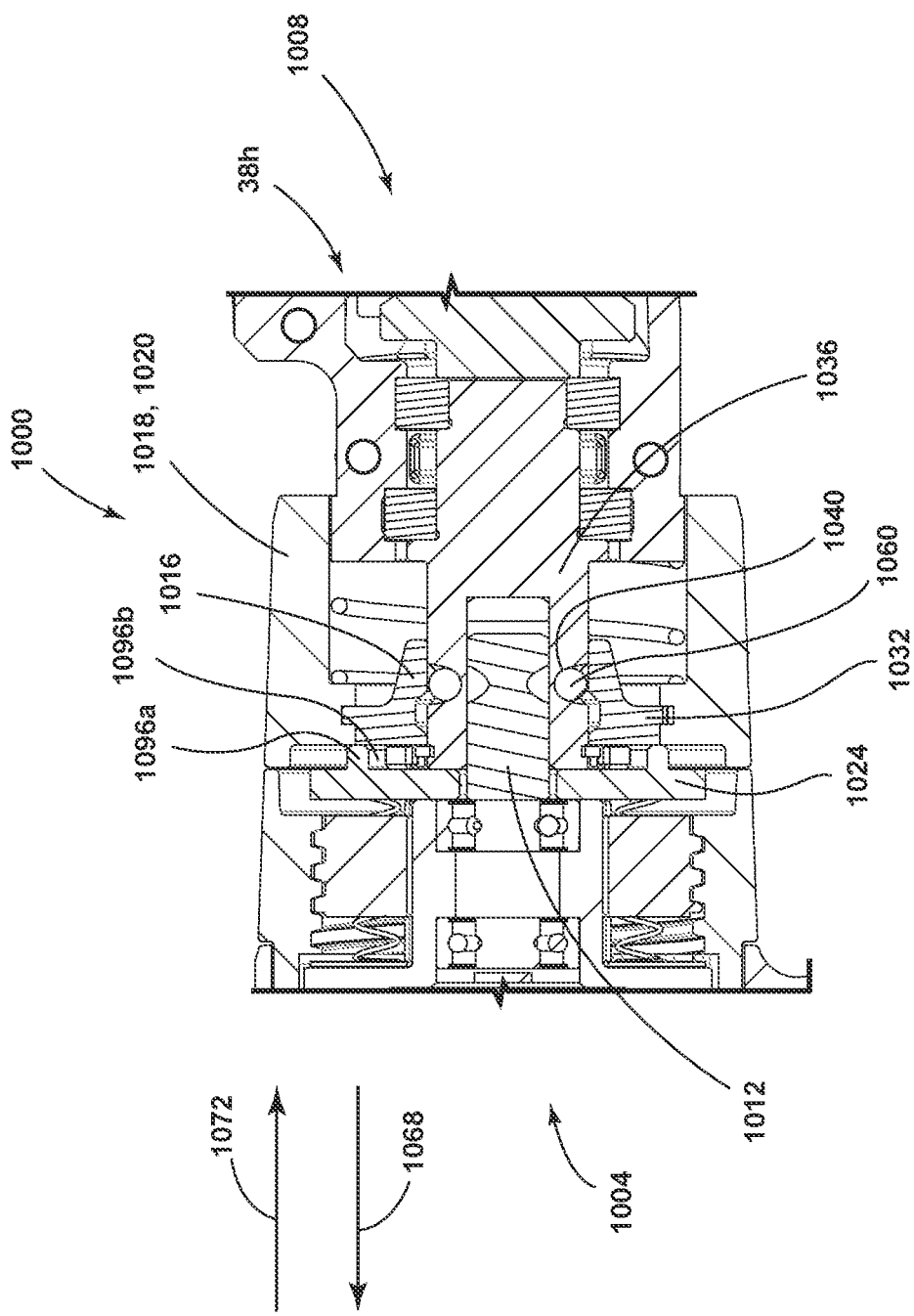
FIG. 39 is a cross-sectional view of an eight embodiment of an attachment mechanism for coupling an accessory to a power tool.
Figure 40:
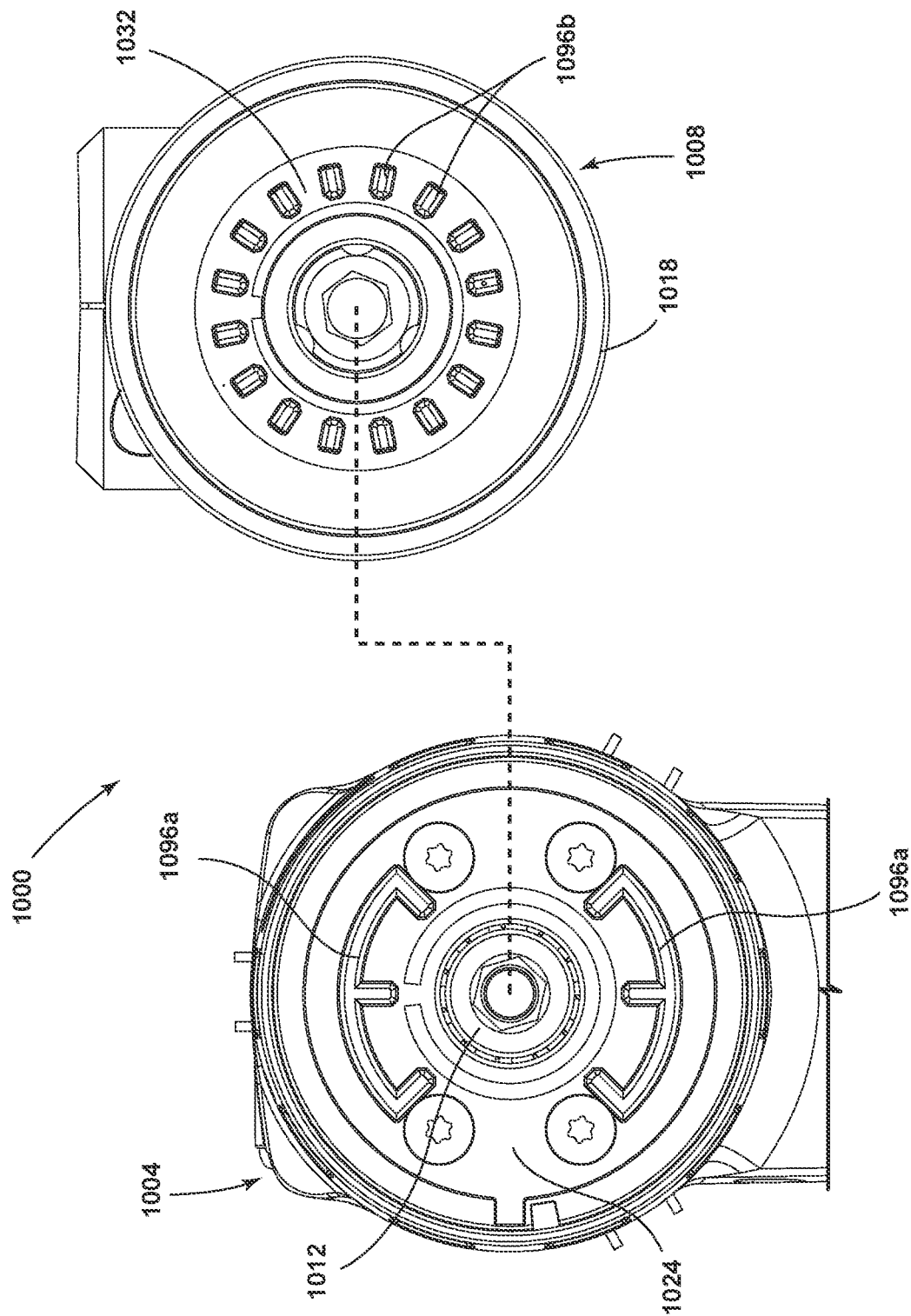
FIG. 40 is an end view of the accessory side of the attachment mechanism and the tool side of the attachment mechanism of FIG. 39 when disconnected from one another.

FIGS. 39-40 illustrate an eight embodiment of an attachment mechanism 1000 configured to connect an accessory 38h to a power tool 10. The attachment mechanism 1000 includes a tool-side attachment 1004 and an accessory-side attachment 1008. In the illustrated embodiment, the tool-side attachment 1004 includes a spindle 1012 and a first mating member 1024. The accessory-side attachment 1008 includes a sleeve 1018, a hub 1036, a plurality of ball detents 1060, and a second mating member 1032.

The first mating member 1024 includes a plurality of engagement members 1096a on a front face of the mating member 1024. In the illustrated embodiment, the engagement members 1096a are arch shaped with a plurality of teeth extending radially inward from the arch. The illustrated engagement member 1024 includes two arch shaped engagement members 1096a with three teeth extending from each arch. However, in other embodiments, different the engagement members 1096a may have different sides, shapes. Likewise, there may be a greater or fewer number of engagement members 1096a.

The spindle 1012 of the tool-side attachment 1004 includes an annular recess 1040 extending around an outer circumference of the spindle 1012. The annular recess 1040 is configured to receive the ball detents 1060 of the accessory-side attachment 1008. In other embodiments, the annular recess 1040 can be replaced with a plurality of apertures for receiving the ball detents 1060.

The plurality of ball detents 1060 are carried by the hub 1036 positioned within the accessory 38h. The ball detents 1060 and are configured to engage with the annular recess 1040 of the spindle 1012 to axially lock the accessory 38h to the power tool 10. The ball detents 1060 are movable between a first position (i.e., a locked position), in which the ball detents 1060 are biased radially inward to engage the spindle 1012, and a second position (i.e., an unlocked position), in which the ball detents 1060 are moved radially outward to release the spindle 1012. The ball detents 1060 are biased radially inward by the sleeve 1018.

With reference to FIG. 39, the sleeve 1018 includes an inner sleeve 1016 that engages the ball detents 1060 and an outer sleeve 1020 extending circumferentially around the inner sleeve 1016, which is actuable by a user. More specifically, the inner sleeve 1016 extends circumferentially about the hub 1036 to selectively bias the ball detents 1060 radially inward and into engagement with the annular recess 1040 of the spindle 1012. When in the default position, the inner sleeve 1016 is biased towards a first direction 1068 in which the ball detents 1060 are forced radially inward to axially lock the accessory 38h to the power tool 10. The inner sleeve 1016 is fixed to the outer sleeve 1020. Accordingly, an operator can axially slide the outer sleeve 1020 in a second direction 1072, which thereby moves the inner sleeve 1016 in the second direction 1072 to release the ball detents 1060 and unlock the accessory 38h from the power tool 10.

In addition, the accessory-side attachment 1008 includes the second mating member 1032, which engages with the first mating member 1024 on the tool-side attachment 1004 to rotationally lock the accessory 38h to the power tool 10. In the illustrated embodiment, the second mating member 1032 is integrally formed with the inner sleeve 1016. However, in other embodiments, the second mating member 1032 can be a separate element from the inner sleeve 1016. The second mating member 1032 includes a plurality of engagement elements 1096b, which interlock with the engagement elements 1096a on the first mating member to prevent rotation of the accessory 38h relative to the power tool 10. In the illustrated embodiment, the second mating member 1032 includes a plurality of teeth on a front face of the second mating member 1032. Because the second mating member 1032 is fixed to the inner sleeve 1016, the engagement members 1096a and 1096b are disengaged from one another by movement of the outer sleeve 1020. Specifically, axial movement of the outer sleeve 1020 axially moves the inner sleeve 1016, and thereby disengages the engagement members 1096a and 1096b to rotationally unlock the accessory 38h. Accordingly, axially movement of the outer sleeve 1020 simultaneously unlocks the accessory 38h from the power tool 10 in both the axial and rotational directions.

Although the invention has been described in detail with reference to certain preferred embodiments, variations and modifications exist within the scope and spirit of one or more independent aspects of the invention as described.

What is claimed is:

1. An attachment mechanism for connecting an accessory to a rotary power tool, the attachment mechanism comprising:
   a tool-side attachment including
      a spindle driven by a motor of the power tool, and
      a first mating member positioned on the tool; and
   an accessory-side attachment including
      a housing having a body and a plurality of arms extending therefrom,
      a hub rotatably supported within the housing between the arms and configured to be coupled to the spindle to receive torque therefrom, a ball detent disposed within the hub and selectively engagable with the spindle to axially lock the accessory to the power tool, a sleeve axially slidable relative to the arms and the hub between a first position in which the sleeve biases the ball detent radially inward and into engagement with the spindle when coupled to the hub to axially secure the accessory to the tool, and a second position in which the ball detent is disengageable from the spindle to release the accessory from the tool, and a second mating member received within the sleeve and axially fixed to the arms of the housing, wherein the first and second mating members are engaged when the accessory is axially secured to the tool to rotationally fix the accessory to the tool.

2. The attachment mechanism of claim 1, wherein the sleeve includes a plurality of apertures through which the plurality of arms extend, and wherein the arms limit movement of the sleeve relative to the housing to translation between the first and second positions.

3. The attachment mechanism of claim 2, wherein the second mating member is axially fixed to a distal end of each of the arms.

4. The attachment mechanism of claim 3, wherein the second mating member is fastened to the arms.

5. The attachment mechanism of claim 3, wherein the sleeve includes an inner portion in sliding contact with the hub and an outer portion connected with the inner portion by a plurality of radially extending ribs.

6. The attachment mechanism of claim 5, wherein each of the apertures in the sleeve is defined between two adjacent ribs.

7. The attachment mechanism of claim 1, wherein the first mating member includes a first plurality of teeth, and wherein the second mating member includes a second plurality of teeth engaged with the teeth on the first mating member when the accessory is axially secured to the tool.

8. The attachment mechanism of claim 7, wherein the second mating member is a disk having a face and an outer circumference, and wherein the second plurality of teeth are positioned on the face of the disk.

9. The attachment mechanism of claim 1, further comprising a spring biasing the sleeve towards the first position.

10. The attachment mechanism of claim 9, wherein the second mating member retains the sleeve in the first position, against the bias of the spring.

11. An accessory for use with a rotary power tool having a rotatable spindle and a first mating member, the accessory comprising:

a housing having a body and a plurality of arms extending therefrom;

a hub rotatably supported within the housing between the arms and configured to be coupled to the spindle to receive torque therefrom;

a ball detent disposed within the hub and selectively engagable with the spindle to axially lock the accessory to the power tool;

a sleeve axially slidable relative to the arms and the hub between a first position in which the sleeve biases the ball detent radially inward and into engagement with the spindle when coupled to the hub to axially secure the accessory to the tool, and a second position in which the ball detent is disengageable from the spindle to release the accessory from the tool; and a second mating member received within the sleeve and axially fixed to the arms of the housing, wherein the first and second mating members are engaged when the accessory is axially secured to the tool to rotationally fix the accessory to the tool.

12. The accessory of claim 11, wherein the sleeve includes a plurality of apertures through which the plurality of arms extend, and wherein the arms limit movement of the sleeve relative to the housing to translation between the first and second positions.

13. The accessory of claim 12, wherein the second mating member is axially fixed to a distal end of each of the arms.

14. The accessory of claim 13, wherein the second mating member is fastened to the arms.

15. The accessory of claim 13, wherein the sleeve includes an inner portion in sliding contact with the hub and an outer portion connected with the inner portion by a plurality of radially extending ribs.

16. The accessory of claim 15, wherein each of the apertures in the sleeve is defined between two adjacent ribs.

17. The accessory of claim 11, wherein the first mating member includes a first plurality of teeth, and wherein the second mating member includes a second plurality of teeth engaged with the teeth on the first mating member when the accessory is axially secured to the tool.

18. The accessory of claim 17, wherein the second mating member is a disk having a face and an outer circumference, and wherein the second plurality of teeth are positioned on the face of the disk.

19. The accessory of claim 11, further comprising a spring biasing the sleeve towards the first position.

20. The accessory of claim 19, wherein the second mating member retains the sleeve in the first position, against the bias of the spring.

21. The attachment mechanism of claim 1, wherein the second mating member includes an opening through which the hub extends.

22. The attachment mechanism of claim 5, wherein a gap is formed between the inner portion and the outer portion of the sleeve.

23. The attachment mechanism of claim 22, wherein the second mating member is received within the gap.

24. The accessory of claim 11, wherein the second mating member includes an opening through which the hub extends.

25. The accessory of claim 15, wherein a gap is formed between the inner portion and the outer portion of the sleeve.

26. The accessory of claim 25, wherein the second mating member is received within the gap.

* * * * *